United States Patent

Hamano et al.

Patent Number: 5,138,492
Date of Patent: Aug. 11, 1992

[54] REAR-FOCUS TYPE ZOOM LENS SUPPRESSING FLUCTUATION OF ABERRATION

[75] Inventors: Hiroyuki Hamano; Akihisa Horiuchi, both of Kanagawa, Japan

[73] Assignee: Canon Kabushiki Kaisha, Tokyo, Japan

[21] Appl. No.: 730,088

[22] Filed: Jul. 15, 1991

[30] Foreign Application Priority Data

Jul. 20, 1990 [JP] Japan .......................... 2-192681
Jul. 20, 1990 [JP] Japan .......................... 2-192682
Jul. 20, 1990 [JP] Japan .......................... 2-192683

[51] Int. Cl.$^5$ .................... G02B 15/14; G02B 13/18
[52] U.S. Cl. ........................... 359/684; 359/708; 359/713
[58] Field of Search ............... 359/684, 687, 708, 713

[56] References Cited

U.S. PATENT DOCUMENTS 4,842,385 6/1989 Tanaka ............................. 359/684
5,009,492 4/1991 Hamano ........................... 359/684

Primary Examiner—Scott J. Sugarman
Attorney, Agent, or Firm—Fitzpatrick, Cella, Harper & Scinto

[57] ABSTRACT

A zoom lens of the rear focus type of the invention comprises, from an object side, a first lens unit of positive refractive power, a second lens unit of negative refractive power, a third lens unit of positive refractive power and a fourth lens unit of positive refractive power. The second lens unit is moved toward an image side to effect zooming from a wide-angle end to a telephoto end, while an image shift resulting from the zooming is compensated for by moving the fourth lens unit, and focusing is performed by moving the fourth lens unit. Letting the focal length of the i-th lens unit be denoted by $F_i$, the local length of the entire lens system in the telephoto end by $F_T$, the F-number at full open aperture in the telephoto end by $F_{NOT}$ and the semi-angle of view in the telephoto end by T, at least one of the following conditions (1), (2) and (3) is satisfied:

$$0.02 < \frac{F_1^2 \cdot F_{NOT} \cdot \tan \omega T}{F_T^2} < 0.1 \quad (1)$$

$$0.09 < |F_2/F_T| < 0.2 \quad (2)$$

$$0.59 < |F_3/F_4| < 0.85 \quad (3)$$

8 Claims, 16 Drawing Sheets

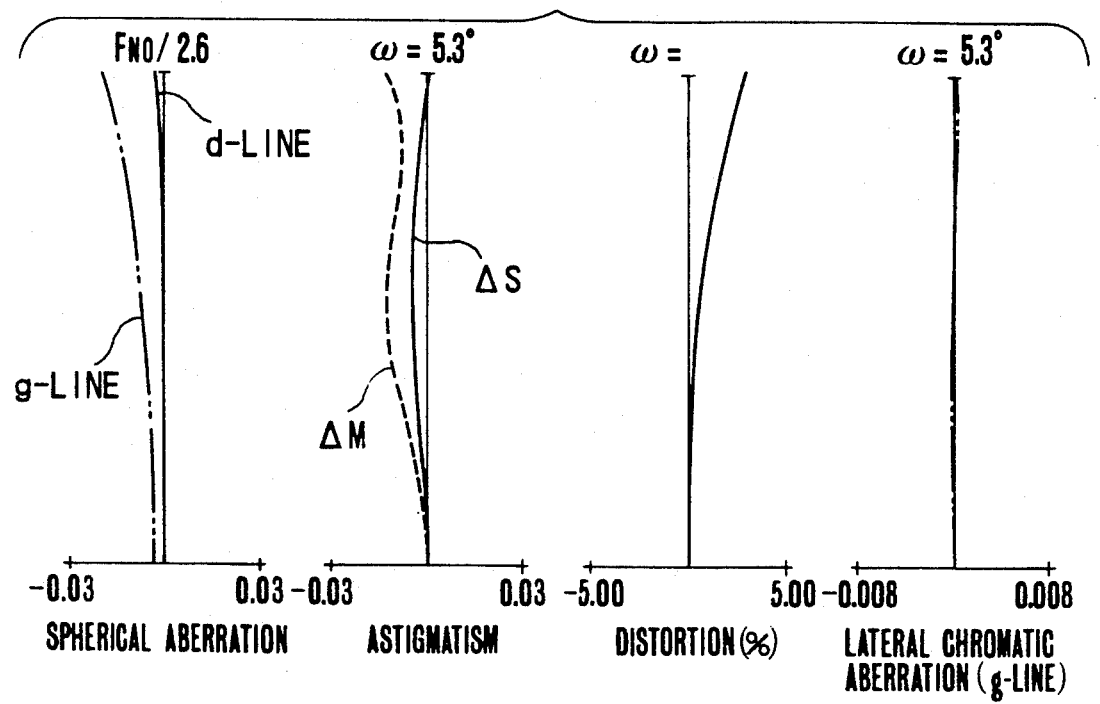

REAR-FOCUS TYPE ZOOM LENS SUPPRESSING FLUCTUATION OF ABERRATION

BACKGROUND OF THE INVENTION

1. Field of the Invention

This invention relates to zoom lenses of the rear focus type and, more particularly, to zoom lenses of the rear focus type suited to extend the zooming range up to 6 and increase the aperture ratio to about 1.8 in F-number for use in video cameras, still video cameras or cameras for broadcasting. Still more particularly, it relates to improvements over U.S. Pat. No. 4,859,042 and U.S. Pat. No. 5,009,492 commonly assigned to the assignee of the present invention.

2. Description of the Related Art

A type of zoom lens in which a lens unit other than the front or first lens unit is used for focusing, or the so-called rear focus type, has been employed in many previous proposals for zoom lenses in cameras for photography, video cameras, etc.

In general, the use of the rear focus type in zoom lenses decreases the effective diameter of the first lens unit as compared with a zoom lens in which a first lens unit is moved for focusing, making it easier to construct the entire lens system in compact form, and also to extend the focusing range toward shorter object distances, particularly to make close-up photography. Still another advantage arising from a relatively small size and light weight the focusing lens unit has is that the power of driving the focusing lens unit may be decreased, so that speedy focusing can be done at the ordinary power.

Such a zoom lens of the rear focus type is disclosed in, for example, Japanese Laid-Open Patent Application No. Sho 63-44614, comprising, from front to rear, a first lens unit of positive refractive power, a second lens unit of negative refractive power for varying the focal length, a third lens unit of negative refractive power for compensating for the image shift as the focal length varies, and a fourth lens unit of positive refractive power, these four lens units in total, or a so-called 4-unit zoom lens, wherein the third lens unit is made movable for focusing. However, this zoom lens has to get a space large enough to assure the total movement of the third lens unit. This leads to a tendency to increase the total lens length.

In Japanese Laid-Open Patent Application No. Sho 58-136012, the zooming section is constructed with three or more lens units, part of which is moved to effect focusing.

In Japanese Laid-Open Patent Application No. Sho 63-247316, a first lens unit of positive refractive power, a second lens unit of negative refractive power, a third lens unit of positive refractive power and a fourth lens unit of positive refractive power are arranged in this order from the object side, wherein the second lens unit is moved to vary the focal length, and the fourth lens unit is moved to compensate for the image shift as the focal length varies and to adjust focus.

In Japanese Laid-Open Patent Application No. Sho 58-160913, of the four lens units of positive, negative, positive and positive refractive powers in this order from the object side, the first and second lens units are moved to vary the focal length, and the fourth lens unit is moved to compensate for the image shift as the focal length varies. Further, one or two of these lens units are made movable for focusing.

The zoom lenses of the rear focus type generally have a minimized size and an ability to perform speedy focusing, and are feasible to nearer close-up photography.

On the other hand, however, the range of fluctuation of aberrations at the time of focusing is caused to increase largely. Therefore, a problem arises that it becomes very difficult to maintain good stability of optical performance at a high level throughout the entire range of object distances from an infinitely distant object to a closest object, while still maintaining the minimization of the bulk and size of the entire lens system.

Particularly when the aperture ratio and zoom ratio of the zoom lens are increased at once, an additional problem arises that it becomes very difficult to obtain a high optical performance throughout the extended zooming range as well as throughout the entire focusing range.

Meanwhile, since, in the rear focus type of zoom lens, the focusing movement of the focusing lens varies depending on the focal length of the entire lens system, the auto-focus techniques of the external measurement type using infrared light or the like are hardly applicable.

So, the common method of automatic focusing used in video cameras or the like is to use the video signals.

In this method, either the image sensor or part of the lens system is subjected to minute vibration so as to obtain a direction discriminating signal for automatic focusing. This method is very advantageous for improving the accuracy of focusing control and the focusing speed.

If it is the image sensor such as a CCD that is subjected to minute vibration by using the piezoelectric element, the advantage lies in the point that the signal is obtained in no relation with the position sensitivity of the focusing lens. However, this technique means the necessity of surplus driving means. So, in this point, the complexity of structure is caused to increase, being disadvantageous in terms of the cost. As the zoom lens is of the rear focus type, particularly with the use of the lens unit nearest to the image plane in focusing, the sensitivity of the focusing lens varies to a relatively small extent. Hence, it is advantageous to subject the focusing lens to minute vibration, or so-called wobbling, so as to obtain the signal representing the direction to which automatic focusing is to go, so that the structure is simplified and the cost is reduced.

When the focusing lens is subjected to minute vibration, the point at which the off-axial light ray focuses itself changes in position, or the so-called image shake phenomenon takes place.

SUMMARY OF THE INVENTION

The present invention, while employing the rear focus type of zoom lens, has, despite a simultaneous large increase of the aperture ratio and zoom ratio, to achieve a shortening of the total length of the entire lens system. An object of the invention is that such a zoom lens gets a good optical performance from the wide-angle end to the telephoto end, or throughout the entire range of variation of the focal length, and from an infinitely distant object to a closest object, or throughout the entire range of object distances.

Another object of the invention is to provide a zoom lens of the rear focus type capable of reducing the image shake at the time of wobbling.

A zoom lens of the rear focus type in relation with the invention comprises, from an object side, a first lens unit of positive refractive power, a second lens unit of negative refractive power, a third lens unit of positive refractive power and a fourth lens unit of positive refractive power, the second lens unit being moved toward an image side to effect zooming from a wide-angle end to a telephoto end, while an image shift resulting from the zooming is compensated for by moving the fourth lens unit, and focusing being performed by moving the fourth lens unit, wherein letting the focal length of the i-th lens unit be denoted by $F_i$, the focal length of the entire lens system in the telephoto end by $F_T$, the F-number at full open aperture in the telephoto end by $F_{NOT}$ and the semi-angle of view in the telephoto end by $\omega_T$, at least one of the following conditions (1), (2) and (3) is satisfied:

$$0.02 < \frac{F_1^2 \cdot F_{NOT} \cdot \tan \omega T}{F_T^2} < 0.1 \quad (1)$$

$$0.09 < |F_2/F_T| < 0.2 \quad (2)$$

$$0.59 < |F_3/F_4| < 0.85 \quad (3)$$

Another zoom lens of the rear focus type which performs wobbling comprises, from an object side, a first lens unit of positive refractive power, a second lens unit of negative refractive power, a third lens unit of positive refractive power and a fourth lens unit of positive refractive power, the second lens unit being moved toward an image side to effect zooming from a wide-angle end to a telephoto end, while an image shift resulting from the zooming is compensated for by moving the fourth lens unit, and focusing being performed by moving the fourth lens unit, wherein a stop lies on the object side of the third lens unit and the following conditions are satisfied:

$$1.05 < |(S_K - E)/F_W| < 1.45 \quad \ldots (4)$$

$$0.59 < |F_3/F_4| < 0.85 \quad \ldots (5)$$

where $E = E_1/(1 - E_1/F_3) + E_2$ $F_i$: the focal length of the i-th lens unit;

$F_W$: the focal length of the entire lens system in the wide-angle end; wherein, with an object at infinity, as the fourth lens unit takes its position nearest to the object side, $E_1$: the distance between the stop and the front principal point of the third lens unit;

$E_2$: the distance between the rear principal point of the third lens unit and the front principal point of the fourth lens unit;

$S_K$: the distance between the rear principal point of the fourth lens unit and the image plane.

BRIEF DESCRIPTION OF THE DRAWINGS

FIGS. 14A, 14B and 14C are graphic representations of the aberrations of a numerical example 9.

DETAILED DESCRIPTION OF THE PREFERRED EMBODIMENTS

Figure 1:
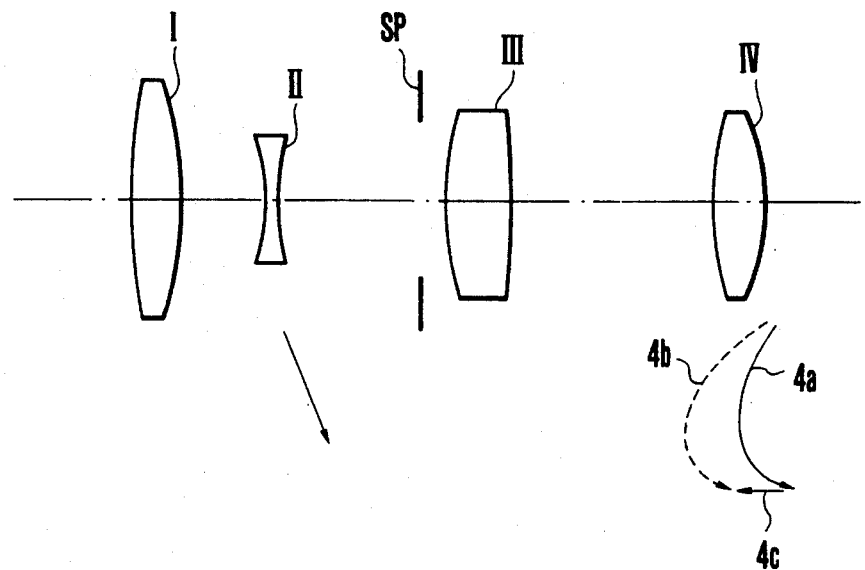
FIG. 1 is a diagram of the power arrangement of a zoom lens.

FIG. 1 in power arrangement diagram shows the paraxial refractive powers of the lens units of the zoom lens of the rear focus type in succession.

In the figure, I denotes the first lens unit of positive refractive power, II the second lens unit of negative refractive power, III the third lens unit of positive refractive power and IV the fourth lens unit of positive refractive power. SP denotes an aperture stop, being disposed in front of the third lens unit III.

During zooming from the wide-angle end to the telephoto end, the second lens unit is moved toward the image side as shown by an arrow, while the fourth lens unit is simultaneously moved to compensate for the shift of an image plane resulting from the zooming.

Further, the fourth lens unit is axially moved to effect focusing. That is, the rear focus type is employed. In the fourth lens unit shown in FIG. 1, a solid line curve 4a and a dash line curve 4b represent the loci of its accompanying movement for compensation of the image shift with variation of the focal length from the wide-angle end to the telephoto end when focusing on an infinitely distant object and a closest object, respectively.

It is to be noted that the first and third lens units remain stationary during zooming and focusing.

Also, as the functions of compensating for the image shift and of focusing are laid on the fourth lens unit, the locus of its movement during zooming from the wide-angle end to the telephoto end is particularly made convex toward the object side as is shown by the curve 4a or 4b of FIG. 1. Thereby, the amenability to utilize the space between the third and fourth lens units in both functions is realized. Thus, a shortening of the total lens length is advantageously achieved.

For example, in the telephoto end, as shown by a straight line 4c of FIG. 1, focusing from an infinitely distant object to a closest object is performed by moving the fourth lens unit forward.

In addition, the effective diameter of the first lens unit which would otherwise take a large value when the first lens unit is used for focusing as in the conventional 4-unit zoom lens, can efficiently be prevented from increasing unduly largely by adopting the rear focus type.

Meanwhile, in the embodiment of the invention, the third lens unit is constructed in the form of a single lens having an aspheric surface. Thus, a reduction of the number of lens elements is achieved and, at the same time, spherical aberration and coma are advantageously corrected by the aspheric surface.

Further, at least one aspheric surface is introduced into the fourth lens unit, thereby advantageously correcting off-axial aberrations such as astigmatism and curvature of field. By setting forth another feature as the inequalities of condition (1) described before, a zoom lens having a good optical performance throughout the entire zooming range and the entire focusing range while still maintaining the minimization of the bulk and size of the entire lens system to be achieved is obtained.

The technical significance of the aforesaid condition is explained below.

The inequalities of condition (1) give a proper range for the refractive power of the first lens unit and have an aim to facilitate good correction of various aberrations with the limitation of the bulk and size of the entire lens system to a minimum.

When the refractive power of the first lens unit is weaker than the equivalent to the upper limit of the inequalities of condition (1), the correction of the aberrations becomes easier to perform, but unduly large a distance from the first lens unit to the stop results. To admit the off-axial light beam, therefore, the diameter of the first lens unit has to be increased largely. When the refractive power of the first lens unit is stronger than the equivalent to the lower limit, the entire lens system gets a short total length, but a drawback is produced that the distance from the first lens unit to the second lens unit becomes so short as to increase the possibility of occurrence of mechanical interference between them.

To reduce the range of fluctuation of aberrations with zooming while maintaining a good optical performance throughout the entire zooming range, it is preferred that the zoom lens according to the invention satisfies at least one of the following conditions:

$$0.09 < |F_2/F_T| < 0.2 \quad \ldots (2)$$

$$0.59 < |F_3/F_4| < 0.85 \quad \ldots (3)$$

The inequalities of condition (2) are concerned with the refractive power of the second lens unit and have an aim to obtain a predetermined zoom ratio efficiently in such a manner that the fluctuation of aberrations with zooming is minimized. When the refractive power of the second lens unit is too strong as exceeding the lower limit, the size of the entire lens system becomes easier to reduce, but the Petzval sum increases in the negative direction. This causes the curvature of field to get larger and also the range of fluctuation of aberrations with zooming to get wider. When the refractive power of the second lens unit is too weak as exceeding the upper limit, the aberrations vary to a lesser degree as zooming. To obtain the predetermined zoom ratio, however, the total zooming movement of the second lens unit must be increased largely. This is no good because the total lens length comes to be much longer.

The inequalities of condition (3) are concerned with the focal lengths of the third and fourth lens units and have an aim to preserve the good optical performance when the lens units that follow the stop are formed to a compact shape.

When the focal length of the third lens unit is short beyond the lower limit of the condition (3), fluctuation of spherical aberration with zooming or focusing becomes difficult to correct. This gives rise to additional problems such as those of raising difficulties in making sure the back focal distance and increasing the total movement of the fourth lens unit.

Conversely when the focal length of the fourth lens unit is short beyond the upper limit, the total lens length becomes difficult to shorten, and the angle of incidence of the off axial light beam on the fourth lens unit gets much larger, so that the aberrations in the fourth lens unit becomes difficult to correct well.

Figure 2:
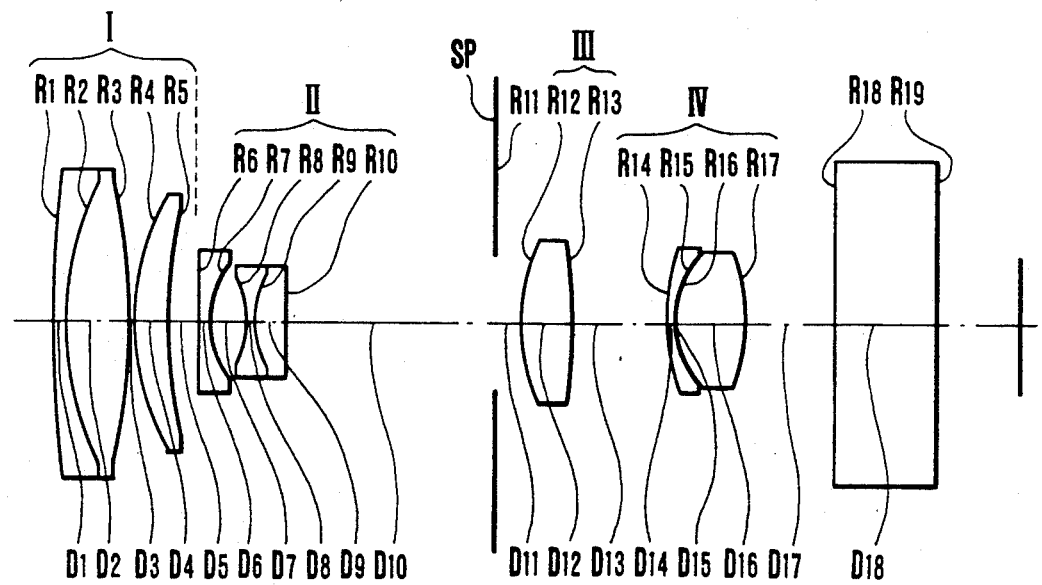
FIG. 2 is a longitudinal section view of an embodiment of the zoom lens according to the invention.

Numerical examples 1 to 4 of zoom lenses of the invention are shown below. The longitudinal section of these lenses is depicted in FIG. 2. In the numerical data for these examples 1 to 4, Ri is the radius of curvature of the i-th lens surface, when counted from the object side, Di is the i-th lens thickness or air separation, and Ni and $\nu i$ are the refractive index and Abbe number of the glass of the i-th lens element.

The shape of the aspheric surface is expressed in the coordinates with an X-axis in the axial direction and an H-axis in the direction perpendicular to the optical axis, the direction in which light advances being taken as positive, by the following equation:

$$X = (1/R)H^2/(1 + (1-(H/R)^2)^{1/2}) + AH^2 + BH^4 + CH^6 + DH^8 + EH^{10}$$

where R is the radius of the osculating sphere and A, B, C, D and E are the aspheric coefficients.

The values of the factors in the conditions (1) to (3) for the numerical examples 1 to 4 are listed in Table-1. In the numerical data, R18 and R19 define a glass block such as face plate.

Figure 3A:
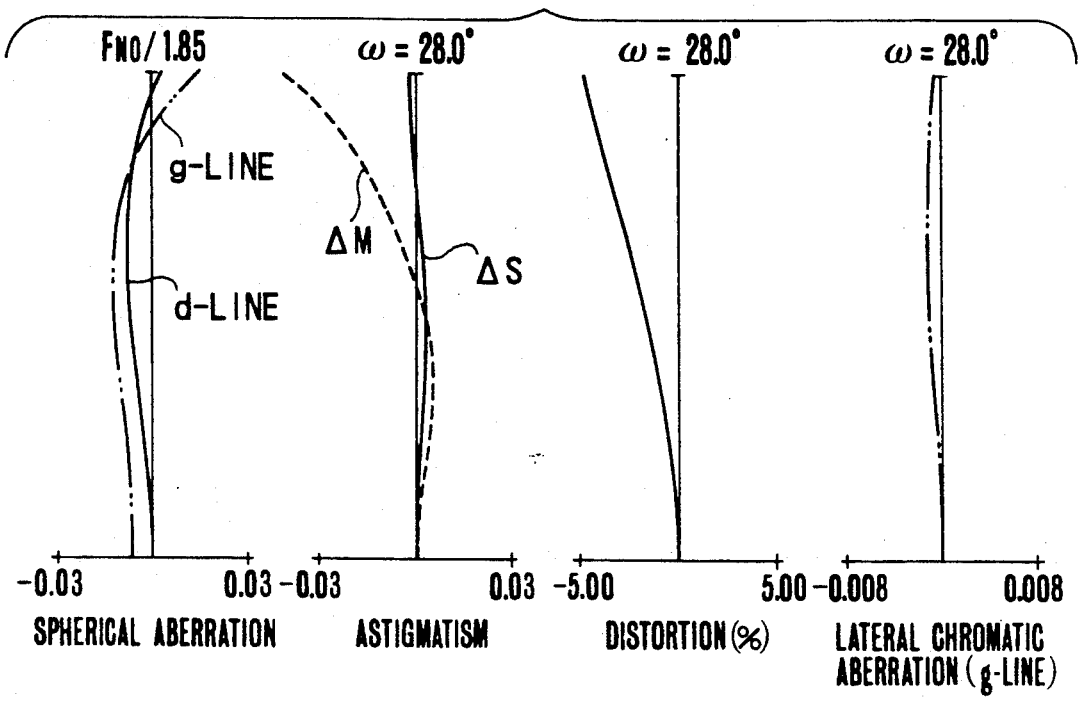
FIGS. 3A, 3B and 3C are graphic representations of the aberrations of a numerical example 1 in the wide-angle end, middle position and telephoto end, respectively.
Figure 3B:
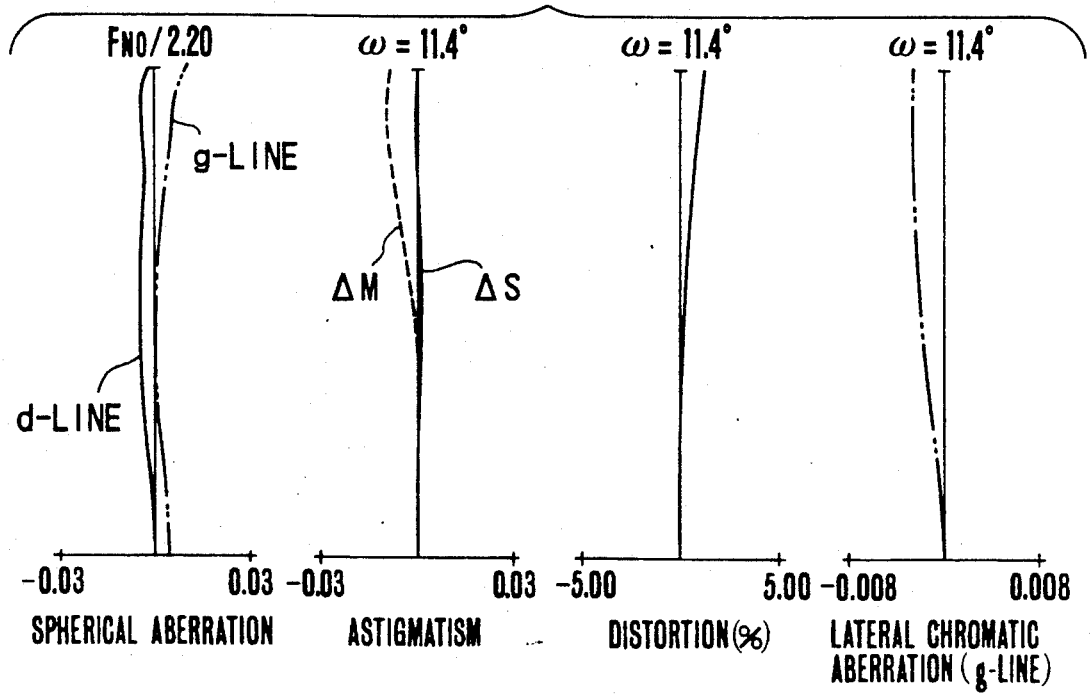
Figure 3C:
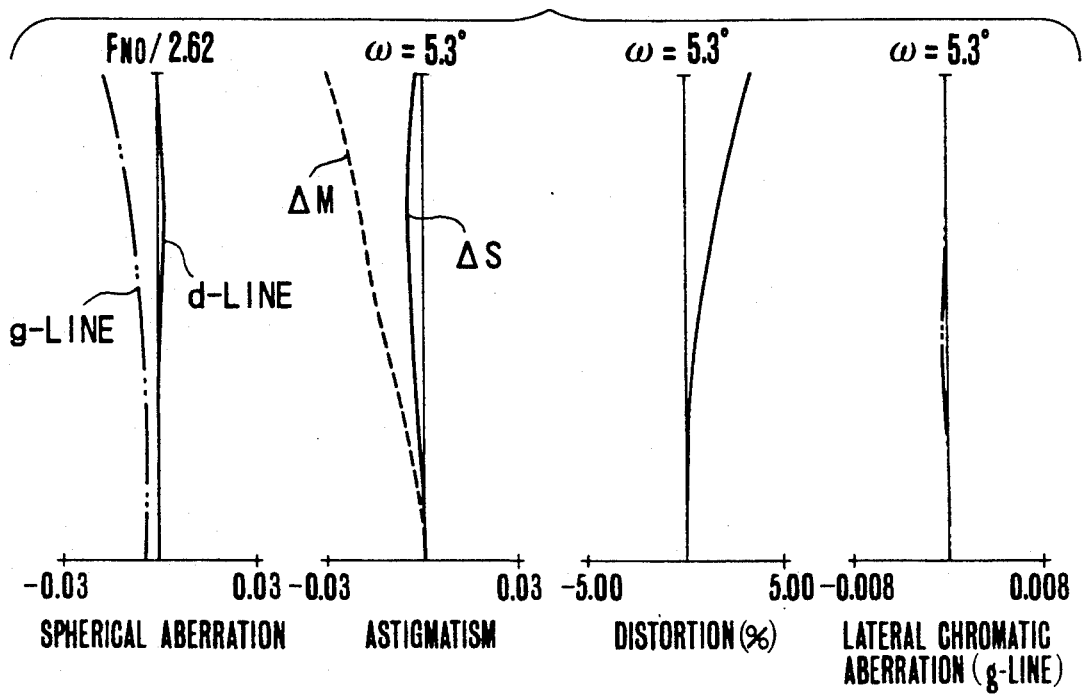

| Numerical Example 1: (FIGS. 3A, 3B and 3C) | | | |
|---|---|---|---|
| F = 1 − 5.7   FNO = 1 : 1.85 − 2.62   2ω = 56.1° − 10.7° | | | |
| R1 = 8.4131 | D1 = 0.1414 | N1 = 1.80518 | ν1 = 25.4 |
| R2 = 2.7100 | D2 = 0.5824 | N2 = 1.60311 | ν2 = 60.7 |
| R3 = −15.6780 | D3 = 0.0333 | | |
| R4 = 2.4161 | D4 = 0.3577 | N3 = 1.80400 | ν3 = 46.6 |
| R5 = 8.0393 | D5 = Variable | | |
| R6 = 9.6040 | D6 = 0.0832 | N4 = 1.88300 | ν4 = 40.8 |
| R7 = 0.7999 | D7 = 0.3796 | | |
| R8 = −1.2229 | D8 = 0.0832 | N5 = 1.51742 | ν5 = 52.4 |
| R9 = 1.2229 | D9 = 0.2829 | N6 = 1.84666 | ν6 = 23.8 |
| R10 = −232.4816 | D10 = Variable | | |
| R11 = Stop | D11 = 0.2000 | N7 = 1.58313 | ν7 = 59.4 |
| R12 = Aspherical | D12 = 0.4825 | | |
| R13 = −8.8137 | D13 = Variable | N8 = 1.84666 | ν8 = 23.8 |
| R14 = 2.6582 | D14 = 0.0832 | | |
| R15 = 1.0999 | D15 = 0.0408 | N9 = 1.58313 | ν9 = 59.4 |
| R16 = 1.2824 | D16 = 0.6240 | | |
| R17 = Aspherical | D17 = 0.8319 | N10 = 1.51633 | ν10 = 64.1 |
| R18 = ∞ | D18 = 1.0815 | | |
| R19 = ∞ | | | |

R12: Aspherical
$R_0 = 1.6920$   $B = -4.9270 \times 10^{-2}$
$C = -4.3994 \times 10^{-3}$   $D = -7.4853 \times 10^{-3}$ R17: Aspherical
$R_0 = -2.1650$   $B = -4.7561 \times 10^{-3}$
$C = 6.7827 \times 10^{-3}$   $D = -1.1136 \times 10^{-1}$

| Lens Separations during Zooming | | | |
|---|---|---|---|
| Focal Length | 1.00 | 2.63 | 5.70 |
| D5 | 0.13 | 1.18 | 1.79 |
| D10 | 1.89 | 0.84 | 0.23 |
| D13 | 0.84 | 0.37 | 0.84 |

Figure 4A:
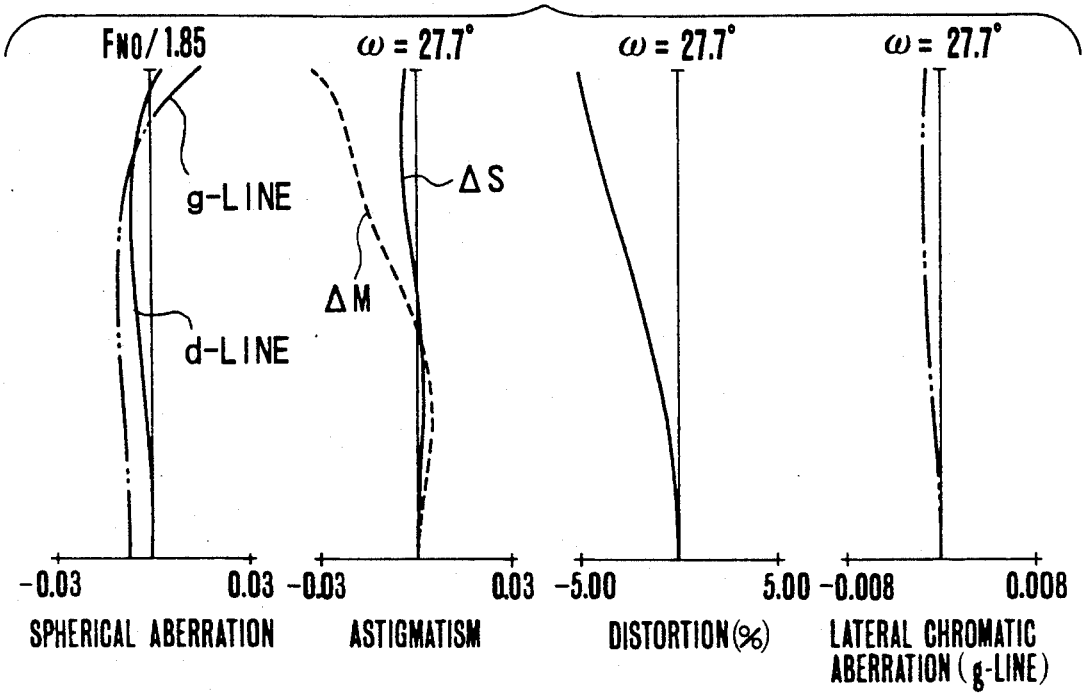
FIGS. 4A, 4B and 4C are graphic representations of the aberrations of a numerical example 2.
Figure 4B:
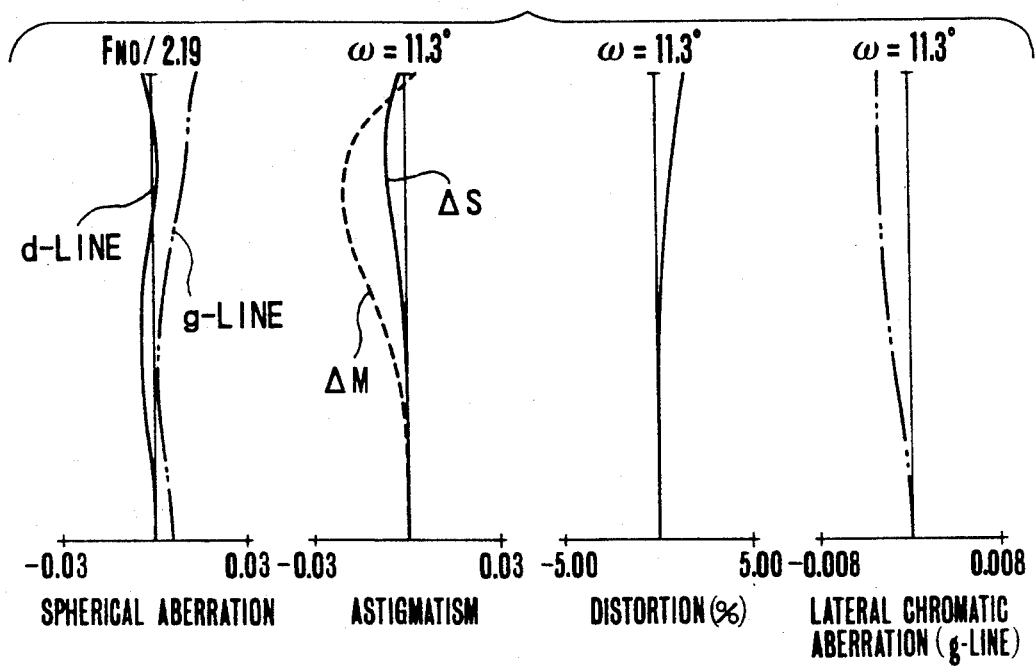
Figure 4C:
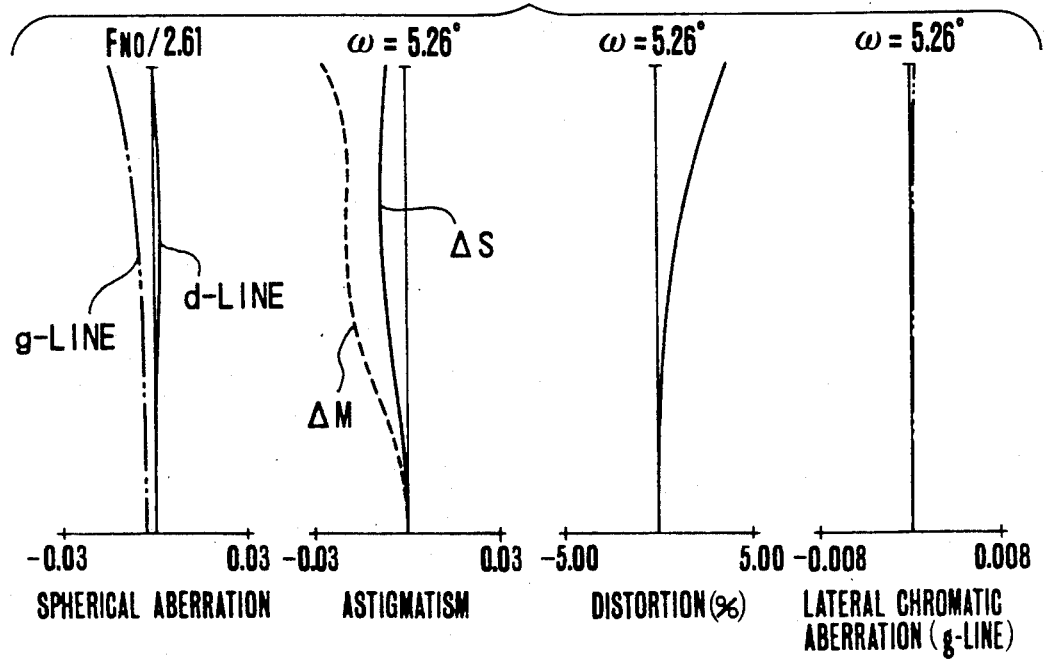

Numerical Example 2: (FIGS. 4A, 4B and 4C)
F = 1 − 5.7   FNO = 1 : 1.85 − 2.61   2ω = 55.4° − 10.5°

| | | | |
|---|---|---|---|
| R1 = 10.3624 | D1 = 0.1393 | N1 = 1.80518 | ν1 = 25.4 |
| R2 = 2.9200 | D2 = 0.5738 | N2 = 1.60311 | ν2 = 60.7 |
| R3 = −10.6103 | D3 = 0.0328 | | |
| R4 = 2.4791 | D4 = 0.3525 | N3 = 1.80400 | ν3 = 46.6 |
| R5 = 7.9121 | D5 = Variable | | |
| R6 = 17.0692 | D6 = 0.0820 | N4 = 1.88300 | ν4 = 40.8 |
| R7 = 0.8441 | D7 = 0.3624 | | |
| R8 = −1.2503 | D8 = 0.0820 | N5 = 1.51742 | ν5 = 52.4 |
| R9 = 1.2503 | D9 = 0.2787 | N6 = 1.84666 | ν6 = 23.8 |
| R10 = −1196.2576 | D10 = Variable | | |
| R11 = Stop | D11 = 0.1967 | N7 = 1.58313 | ν7 = 59.4 |
| R12 = Aspherical | D12 = 0.4918 | | |
| R13 = −9.9063 | D13 = Variable | N8 = 1.84666 | ν8 = 23.8 |
| R14 = 2.5343 | D14 = 0.0820 | | |
| R15 = 1.0621 | D15 = 0.0516 | N9 = 1.58313 | ν9 = 59.4 |
| R16 = 1.2989 | D16 = 0.6230 | | |
| R17 = Aspherical | D17 = 0.8197 | N10 = 1.51633 | ν10 = 64.1 |
| R18 = ∞ | D18 = 0.9180 | | |
| R19 = ∞ | | | |

R12: Aspherical
$R_0 = 1.6027$   $B = -5.8659 \times 10^{-2}$
$C = 6.9020 \times 10^{-3}$   $D = -1.8357 \times 10^{-2}$ R17: Aspherical
$R_0 = -2.1040$   $B = -2.0948 \times 10^{-2}$
$C = 4.6502 \times 10^{-2}$   $D = -1.9803 \times 10^{-1}$

| Lens Separations during Zooming | | | |
|---|---|---|---|
| Focal Length | 1.00 | 2.63 | 5.70 |
| D5 | 0.15 | 1.21 | 1.83 |
| D10 | 1.91 | 0.85 | 0.23 |
| D13 | 0.82 | 0.35 | 0.82 |

Figure 5A:
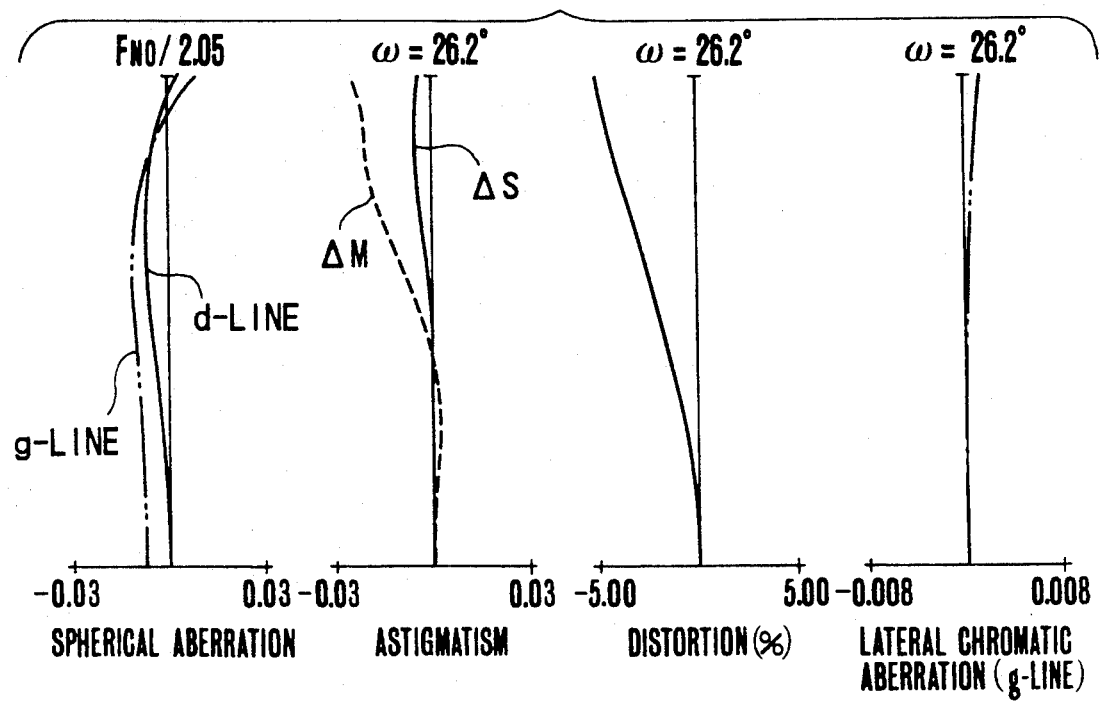
FIGS. 5A, 5B and 5C are graphic representations of the aberrations of a numerical example 3.
Figure 5B:
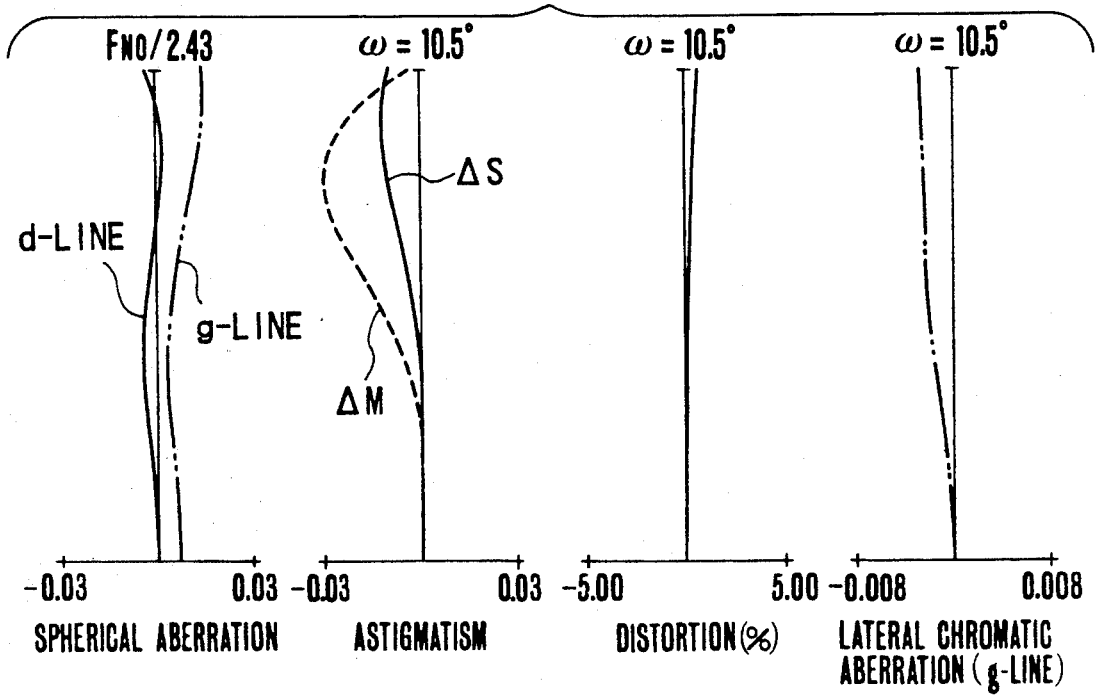
Figure 5C:
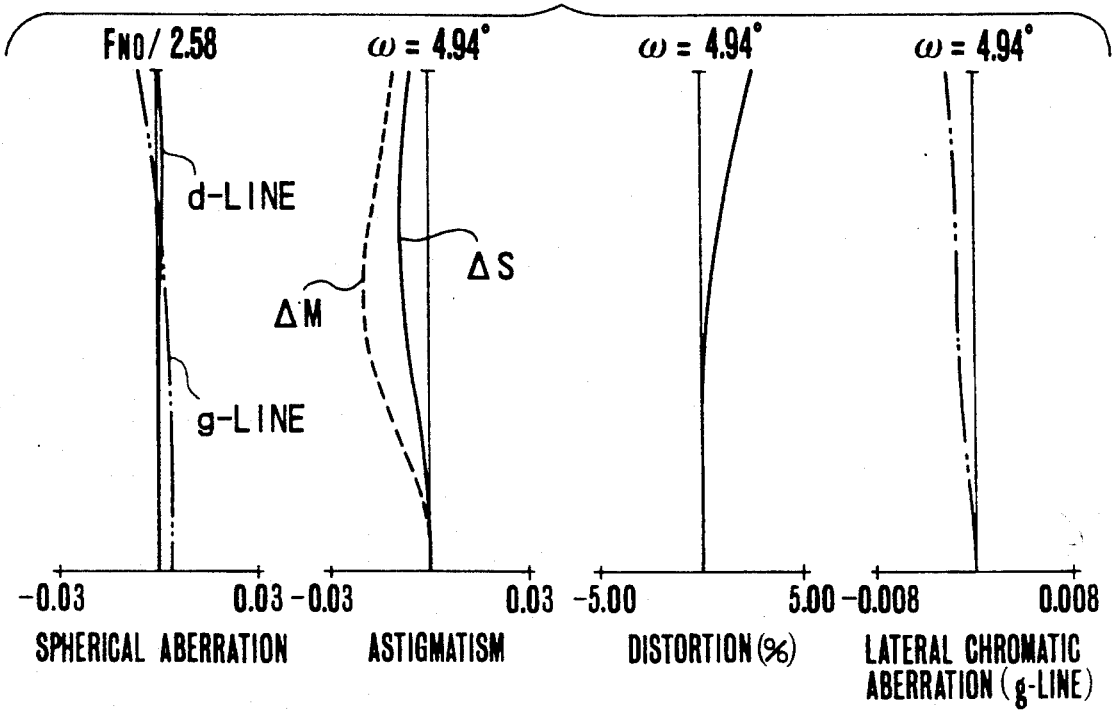

Numerical Example 3: (FIGS. 5A, 5B and 5C)
F = 1 − 5.7   FNO = 1 : 2.05 − 2.58   2ω = 52.4° − 9.9°

| | | | |
|---|---|---|---|
| R1 = 13.1045 | D1 = 0.1385 | N1 = 1.80518 | ν1 = 25.4 |
| R2 = 3.1293 | D2 = 0.5692 | N2 = 1.60311 | ν2 = 60.7 |
| R3 = −9.1395 | D3 = 0.0308 | | |
| R4 = 2.4703 | D4 = 0.3385 | N3 = 1.77250 | ν3 = 49.6 |
| R5 = 6.9013 | D5 = Variable | | |
| R6 = 15.9429 | D6 = 0.0923 | N4 = 1.78590 | ν4 = 44.2 |
| R7 = 0.8170 | D7 = 0.3674 | | |
| R8 = −1.2363 | D8 = 0.0769 | N5 = 1.51742 | ν5 = 52.4 |
| R9 = 1.2363 | D9 = 0.2923 | N6 = 1.84666 | ν6 = 23.8 |
| R10 = −137.6828 | D10 = Variable | | |
| R11 = Stop | D11 = 0.1846 | N7 = 1.58313 | ν7 = 59.4 |
| R12 = Aspherical | D12 = 0.4154 | | |
| R13 = −13.3777 | D13 = Variable | N8 = 1.84666 | ν8 = 23.8 |
| R14 = 2.0691 | D14 = 0.0769 | | |
| R15 = 0.9390 | D15 = 0.0366 | N9 = 1.58313 | ν9 = 59.4 |
| R16 = 1.1207 | D16 = 0.5231 | | |
| R17 = Aspherical | D17 = 0.7692 | N10 = 1.51633 | ν10 = 64.1 |
| R18 = ∞ | D18 = 0.8615 | | |
| R19 = ∞ | | | |

R12: Aspherical
$R_0 = 1.5341$   $B = -5.7575 \times 10^{-2}$
$C = 9.5912 \times 10^{-3}$   $D = -3.7113 \times 10^{-2}$ R17: Aspherical
$R_0 = -2.4869$   $B = -4.9166 \times 10^{-2}$
$C = 8.3806 \times 10^{-2}$   $D = -4.6376 \times 10^{-1}$

| Lens Separations during Zooming | | | |
|---|---|---|---|
| Focal Length | 1.00 | 2.66 | 5.70 |
| D5 | 0.20 | 1.34 | 2.01 |
| D10 | 2.00 | 0.86 | 0.19 |
| D13 | 0.80 | 0.34 | 0.80 |

Figure 6A:
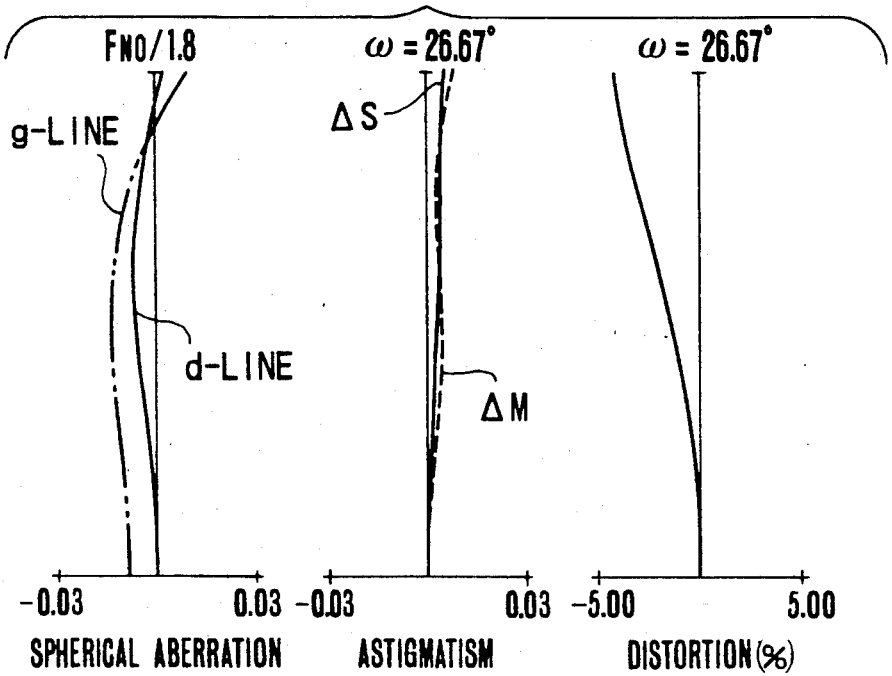
FIGS. 6A, 6B and 6C are graphic representations of the aberrations of a numerical example 4.
Figure 6B:
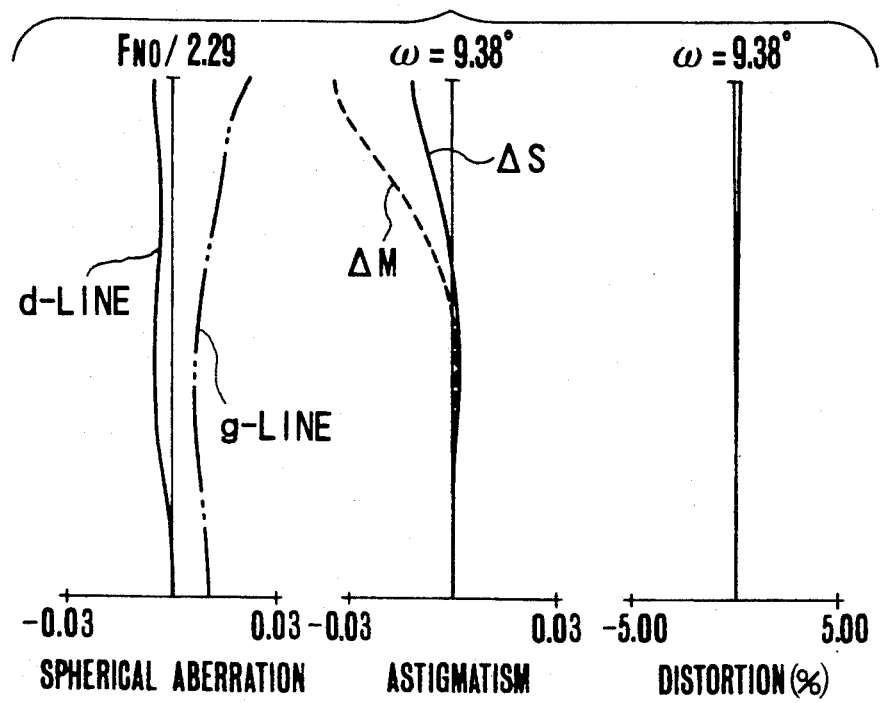
Figure 6C:
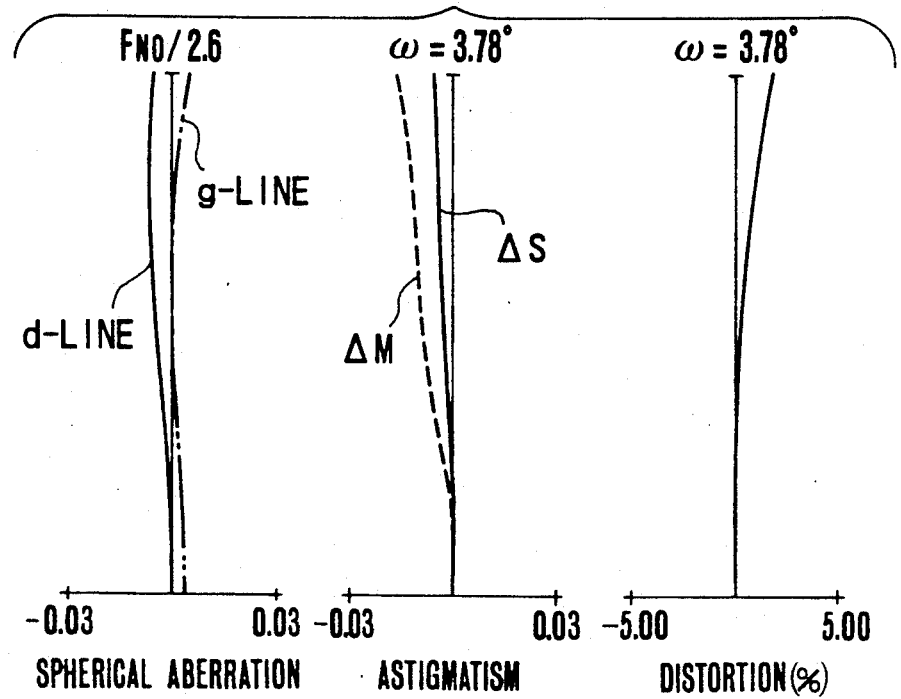

Numerical Example 4: (FIGS. 6A, 6B and 6C)
F = 1 − 7.6   FNO = 1 : 1.8 − 2.6   2ω = 53.3° − 7.56°

| | | | |
|---|---|---|---|
| R1 = 5.6144 | D1 = 0.1570 | N1 = 1.80518 | ν1 = 25.4 |
| R2 = 2.9617 | D2 = 0.8477 | N2 = 1.56384 | ν2 = 60.7 |
| R3 = −10.6757 | D3 = 0.0314 | | |
| R4 = 2.3026 | D4 = 0.3061 | N3 = 1.69680 | ν3 = 55.5 |
| R5 = 3.6017 | D5 = Variable | | |
| R6 = 2.8047 | D6 = 0.0785 | N4 = 1.88300 | ν4 = 40.8 |
| R7 = 0.9418 | D7 = 0.5207 | | |
| R8 = −1.0770 | D8 = 0.0785 | N5 = 1.51633 | ν5 = 64.1 |
| R9 = 1.4881 | D9 = 0.2826 | N6 = 1.84666 | ν6 = 23.8 |
| R10 = 7.7008 | D10 = Variable | | |
| R11 = Stop | D11 = 0.1884 | | |
| R12 = Aspherical | D12 = 0.4710 | N7 = 1.58313 | ν7 = 59.4 |
| R13 = −8.0704 | D13 = Variable | | |
| R14 = 2.1974 | D14 = 0.0785 | N8 = 1.84666 | ν8 = 23.8 |
| R15 = 1.0608 | D15 = 0.0408 | | |
| R16 = 1.2237 | D16 = 0.5808 | N9 = 1.58313 | ν9 = 59.4 |
| R17 = Aspherical | D17 = 0.7378 | | |
| R18 = ∞ | D18 = 0.8320 | N10 = 1.51633 | ν10 = 64.1 |
| R19 = ∞ | | | |

R12: Aspherical
$R_0 = 1.89563$   $B = -3.56869 \times 10^{-2}$
$C = -5.90038 \times 10^{-3}$   $D = -3.52625 \times 10^{-3}$ R17: Aspherical
$R_0 = -2.75943$   $B = -1.94325 \times 10^{-2}$
$C = 4.79339 \times 10^{-3}$   $D = -1.19216 \times 10^{-1}$

| Lens Separations during Zooming | | | |
|---|---|---|---|
| Focal Length | 1.00 | 3.04 | 7.60 |
| D5 | 0.14 | 1.51 | 2.32 |
| D10 | 2.40 | 1.03 | 0.22 |
| D13 | 1.00 | 0.40 | 1.00 |

In another embodiment, the optical parameters of the lens units are made so as to lie in their respective specified ranges by the conditions (4) and (5) described before, thereby producing a zoom lens which not only has the combined feature of the minimum bulk and size of the entire lens system and the good optical performance throughout the zooming and focusing ranges, but also reduces the image shake to a lesser degree during wobbling.

Here, the relationship between the paraxial refractive power arrangement and the image shake caused by the wobbling will be discussed.

Figure 7:
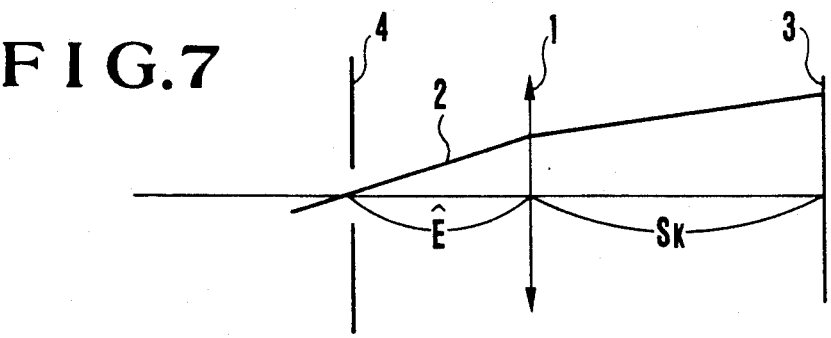
FIG. 7 and FIG. 8 are diagrams for explaining the optical functions.
Figure 8:
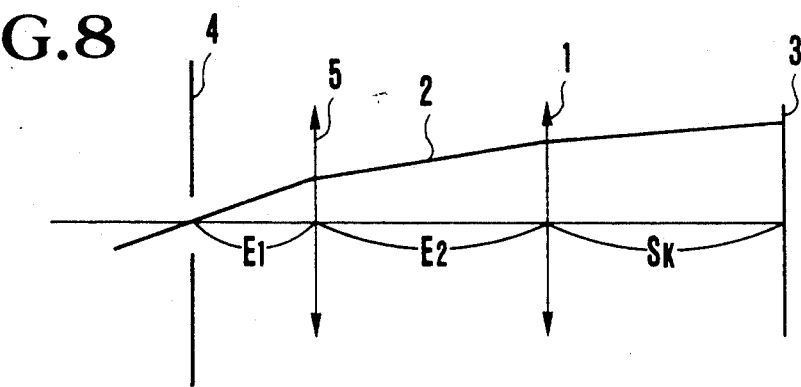

Referring to FIG. 7, on the assumption that a certain lens 1 in the space between the stop 4 and the image plane 3 is used for wobbling, consideration is given to an image shake on the image plane 3 with a ray of light that has passed the center of the stop 4.

The principal ray 2 passing through the stop 4 refracted by the lens 1 and therefrom impinges on the image plane 3.

Now, the height h of incidence of the principal ray on the wobbling lens 1 is given by the following expression:

$$h = -E\alpha$$

where E is the distance from the stop 4 to the lens 1 and $\alpha$ is the angle of emergence of the principal ray 2 from the stop 4.

The angle $\alpha'$ of emergence of the principal ray from the wobbling lens 1 and the image height y on the image plane 3 are expressed respectively as $$\alpha' = \alpha + h\phi = (1 - E\phi)\alpha \quad \text{(A)}$$

$$\begin{aligned} y &= h - S_K\alpha' = -E\alpha - S_K(1 - E\phi)\alpha \\ &= \{-(E + S_K) + S_K E\phi\}\alpha \end{aligned} \quad \text{(B)}$$

where $\phi$ is the refractive power of the wobbling lens 1, and $S_K$ is the distance from the lens 1 to the image plane 3. When the lens displaces by $\Delta x$, then letting $y'$ denote the image height at $E' = E + \Delta x$ and $S_K' = S_K - \Delta x$, the amount of image shake $\Delta y$ can be defined by $$\begin{aligned} \Delta y &= y' - y = (S_K'E' - S_K E)\alpha\phi \\ &= \alpha\phi\{(S_K - E)\Delta x - \Delta x^2\} \end{aligned} \quad \text{(C)}$$

Hence, it is understood that to decrease the image shake, one may decrease the angle $\alpha$ of incidence on the wobbling lens 1, the refractive power $\phi$ of the wobbling lens 1, or the value $|S_K - E|$.

Next, a case where a fixed lens unit 5 exists in the space between the wobbling lens 1 and the stop 4 will be discussed.

The equations for the height $h_1$ of incidence of the ray on the lens unit 5 and the angle $\alpha'_1$ (or $\alpha_2$) of emergence of the ray from the lens unit 5 are expressed as $$h_1 = -E_1\alpha_1$$

$$\alpha_2 = \alpha_1 + h_1\phi_1 = (1 = E_1\phi_1)\alpha_1$$

where $E_1$ is the distance from the stop 4 to the lens unit 5, $\alpha_1$ is the angle of emergence of the ray from the stop 4 and $\phi_1$ is the refractive power of the lens unit 5. Hence, $$\alpha_1 = \alpha_2/(1 - E_1\phi_1) \quad \ldots \text{(D)}$$

$$h_1 = -E_1\alpha_2/(1 - E_1\phi_1) \quad \ldots \text{(E)}$$

Then, the height $h_2$ of incidence of the ray on the wobbling lens 1 is expressed by $$\begin{aligned} h_2 &= h_1 - E_2\alpha_2 \\ &= -(E_1/(1 - E_1\phi_1) + E_2)\alpha_2 \end{aligned} \quad \text{(F)}$$

where $E_2$ is the distance from the lens unit 5 to the wobbling lens 1.
To evaluate the amount of the image shake, one may put into the equation (C)

$$\hat{E} = E_1/(1 - E_1\phi_1) + E_2 \quad \ldots \text{(G)}$$

$$\widetilde{\alpha} = (1 - E_1\phi_1)\alpha_1$$

$$\overline{\phi} = \phi_2$$

where $\phi_2$ is the refractive power of the wobbling lens 1. It should be noted that in the optical system of the embodiment of the invention, $\phi_1 = 1/F_3$ and $\phi_2 = 1/F_4$.

From such a standpoint as described above, the technical significance of each of the inequalities of conditions (4) and (5) is explained below.

The inequalities of condition (4) are concerned with the distance from the image of the stop formed by the third lens unit to the fourth lens unit and the distance from the fourth lens unit and the image plane and have an aim to lessen the image shake caused by the wobbling, while still maintaining the minimization of the size of the lens part subsequent to the stop.

In general, as the lens part subsequent to the stop decreases in size, the image shake caused by the wobbling increases at a zooming station which lies in the middle of the range where the distance $\hat{E}$ has a minimum value when the fourth lens unit moves to the front most position.

Therefore, as is understandable from the equation (C), if the value $|S_K - \hat{E}|$ is made smaller, the image shake gets smaller at this station.

Exceeding the lower limit of the inequalities of condition (4) is advantageous for suppressing the image shake at the time of wobbling, but to allow this advantage, measure must be taken either by increasing the separation between the third and fourth lens units, or by shortening the back focal distance. The use of such means in turn gives rise to problems that the minimization of the size is obstructed and that dust deposited on the lens surfaces gets much more appreciable to the image sensor. These should be avoided here.

Exceeding the upper limit of the inequalities of condition (4), though being advantageous for the minimization of the size of the lens, results in objectionably large increase of the image shake at the time of wobbling, as is understandable from the equation (C).

The inequalities of condition (5), as are equivalent to the inequalities of condition (3), are concerned with the focal lengths of the third and fourth lens units and have an aim to simultaneously fulfill the requirements of minimizing the size of the lens part subsequent to the stop, of maintaining good stability of the optical performance, and of lessening the image shake at the time of wobbling.

When the focal length of the third lens unit is short beyond the lower limit of the inequalities of condition (5), fluctuation of spherical aberration with zooming or with focusing becomes difficult to correct.

Another problems also arise that the back focal distance becomes difficult to secure and that the total movement of the fourth lens unit gets much longer.

Conversely when the focal length of the fourth lens unit is short beyond the upper limit, the total lens length becomes difficult to shorten. The angle of incidence of the off-axial light on the fourth lens unit also gets larger, which in turn increases the image shake at the time of wobbling, as is understandable from the equation (C). So, it is no good.

The satisfaction of the conditions described above suffices for achieving a zoom lens the invention aims at. To further improve the spherical aberration and coma, at least one aspheric surface may be introduced into the third lens unit.

Also, to shorten the overall physical length of the lens units on the object side of the stop, the following condition may be satisfied:

$$0.72 < |F_2/F_W| < 0.92 \quad \ldots (6)$$

The inequalities of condition (6) are concerned with the refractive power of the second lens unit and have an aim to obtain the prescribed zoom ratio efficiently while lessening the variation of aberrations with zooming. When the refractive power of the second lens unit is too strong as exceeding the lower limit, the bulk and size of the entire lens system become easy to minimize, but the Petzval sum increases in the negative direction to increase the curvature of field largely. Further, the fluctuation of aberrations with zooming increases largely. When the refractive power of the second lens unit is too weak as exceeding the upper limit, the fluctuation of aberrations with zooming diminishes, but the required movement of the second lens unit for obtaining the prescribed zoom ration increases largely. Thus, the total lens length comes to elongate objectionably.

Figure 9:
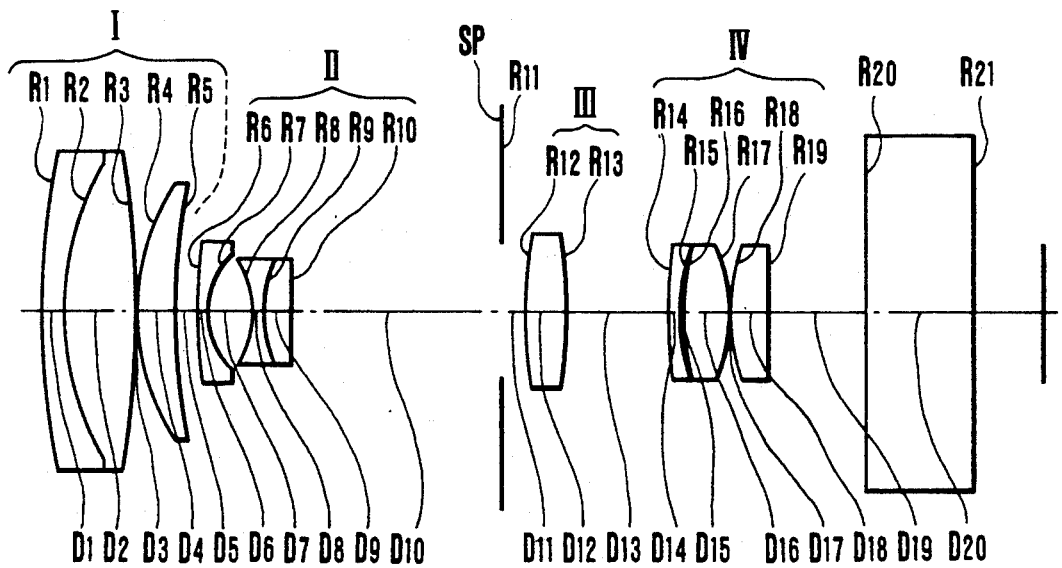
FIG. 9 is a longitudinal section view of another embodiment of the zoom lens according to the invention.

The longitudinal section of the lenses of numerical examples 5 to 7 of the invention is depicted in FIG. 9.

Figure 10A:
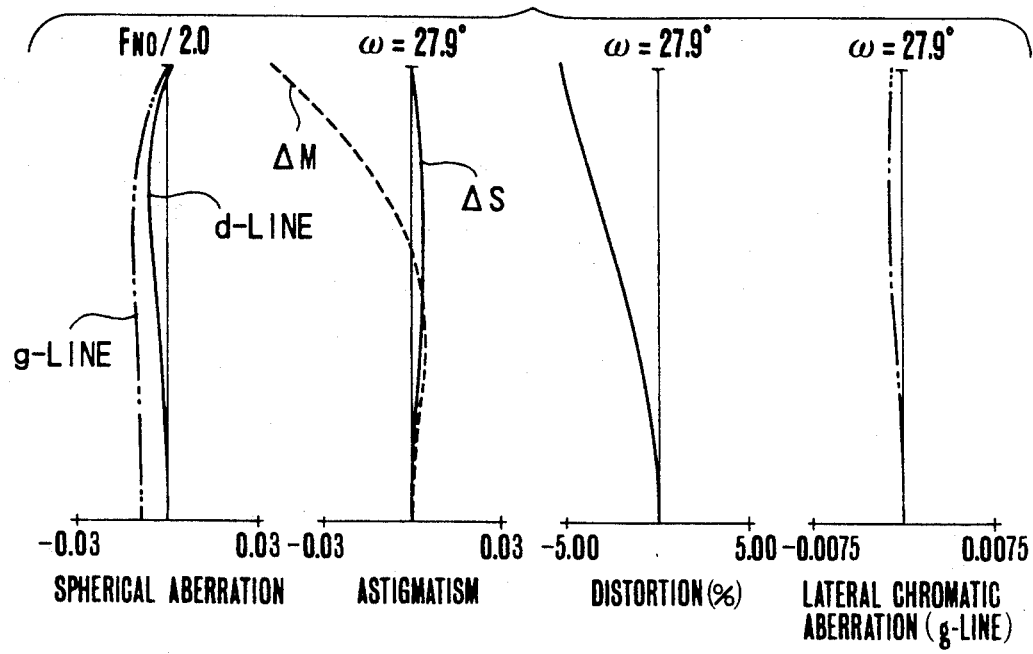
FIGS. 10A, 10B and 10C are graphic representations of the aberrations of a numerical example 5.
Figure 10B:
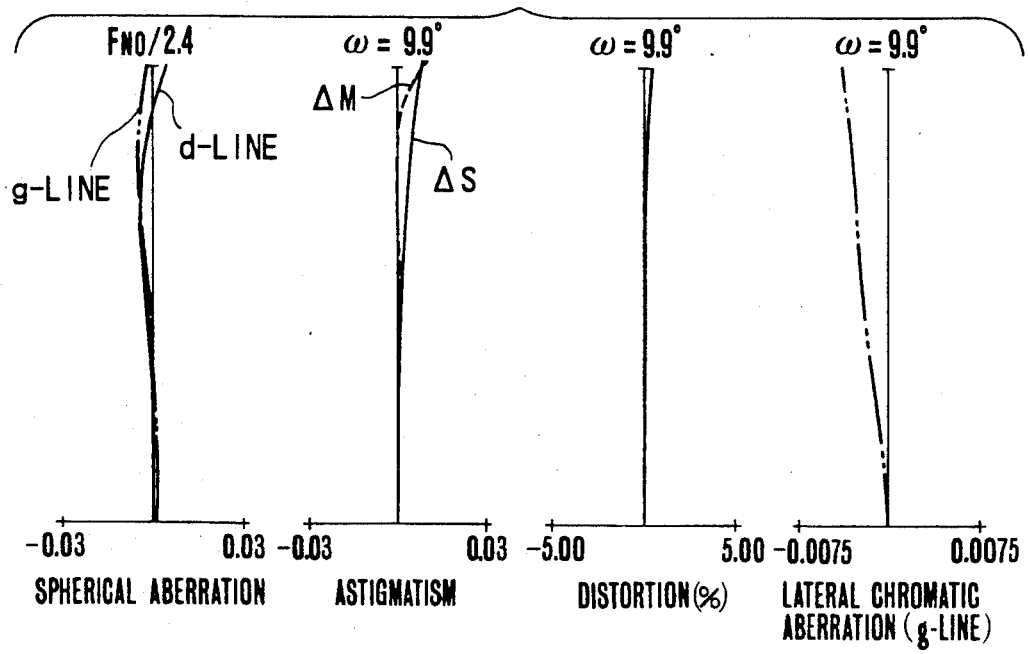
Figure 10C:
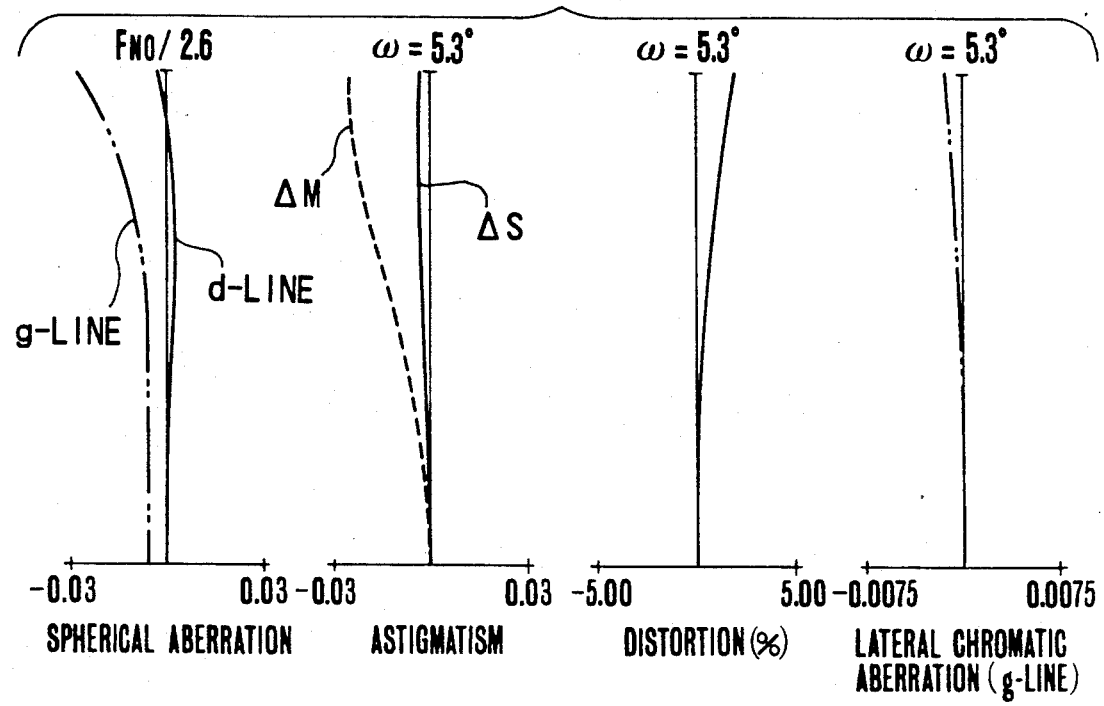

Numerical Example 5: (FIGS. 10A, 10B and 10C)
$F = 1 - 5.7 \quad FNO = 1 : 2.0 - 2.6 \quad 2\omega = 55.8° - 10.6°$

| R1 = 9.3049 | D1 = 0.1488 | N1 = 1.80518 | υ1 = 25.4 |
|---|---|---|---|
| R2 = 2.7830 | D2 = 0.6116 | N2 = 1.60311 | υ2 = 60.7 |
| R3 = −12.9949 | D3 = 0.0331 | | |
| R4 = 2.3031 | D4 = 0.3636 | N3 = 1.80400 | υ3 = 46.6 |
| R5 = 6.6979 | D5 = Variable | | |
| R6 = 8.9137 | D6 = 0.0826 | N4 = 1.88300 | υ4 = 40.8 |
| R7 = 0.7458 | D7 = 0.3636 | | |
| R8 = −1.1326 | D8 = 0.0826 | N5 = 1.51742 | υ5 = 52.4 |
| R9 = 1.1326 | D9 = 0.2645 | N6 = 1.80518 | υ6 = 25.4 |
| R10 = −9.6896 | D10 = Variable | | |
| R11 = Stop | D11 = 0.1600 | N7 = 1.60311 | υ7 = 60.7 |
| R12 = 2.1786 | D12 = 0.3802 | | |
| R13 = −4.2399 | D13 = Variable | N8 = 1.84666 | υ8 = 23.8 |
| R14 = 12.5128 | D14 = 0.0992 | | |
| R15 = 1.8552 | D15 = 0.0331 | N9 = 1.51633 | υ9 = 64.1 |
| R16 = 2.2350 | D16 = 0.3967 | | |
| R17 = −1.9166 | D17 = 0.0331 | N10 = 1.48749 | υ10 = 70.2 |
| R18 = 3.2984 | D18 = 0.2975 | | |
| R19 = −165.2843 | D19 = 0.8264 | N11 = 1.51633 | υ11 = 64.1 |
| R20 = ∞ | D20 = 0.9256 | | |
| R21 = ∞ | | | |

Lens Separations during Zooming

| Focal Length | 1.00 | 3.01 | 5.70 |
|---|---|---|---|
| D5 | 0.17 | 1.32 | 1.82 |
| D10 | 1.85 | 0.70 | 0.20 |
| D13 | 0.89 | 0.41 | 0.89 |

Figure 11A:
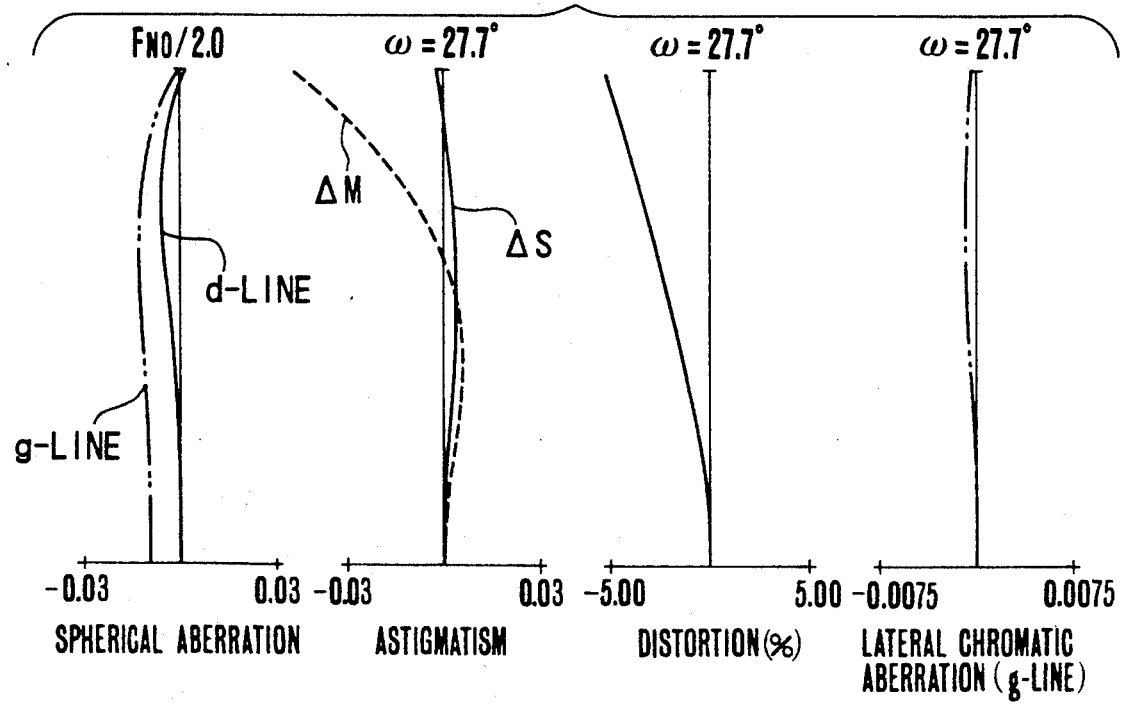
FIGS. 11A, 11B and 11C are graphic representations of the aberrations of a numerical example 6.
Figure 11B:
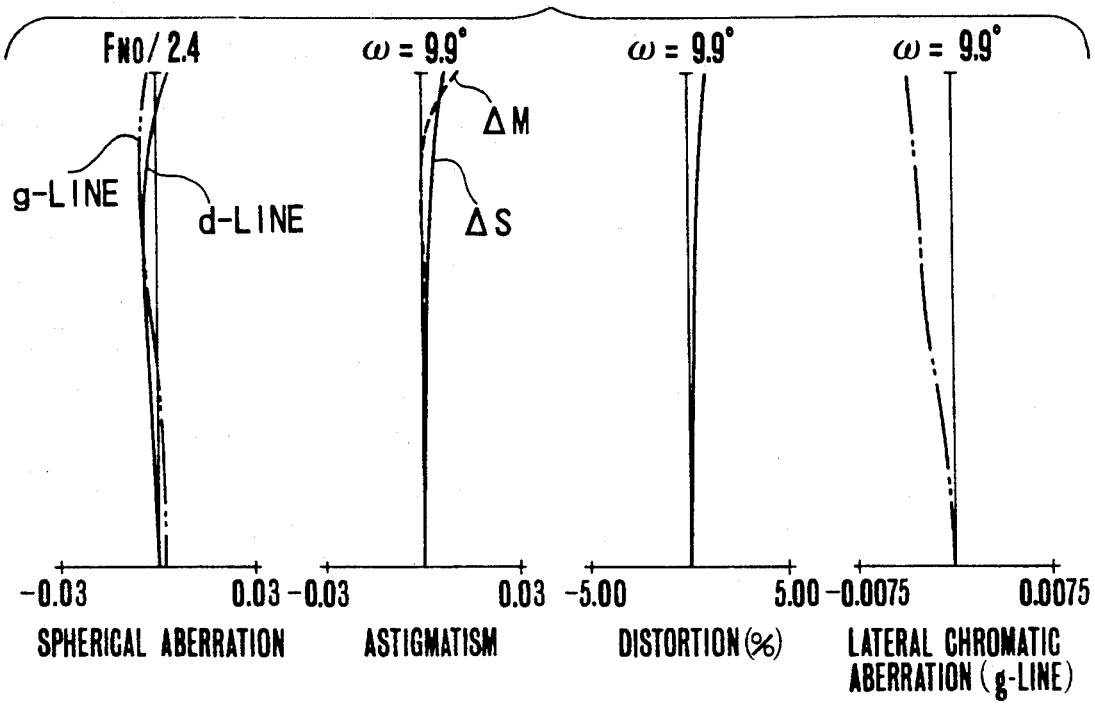
Figure 11C:
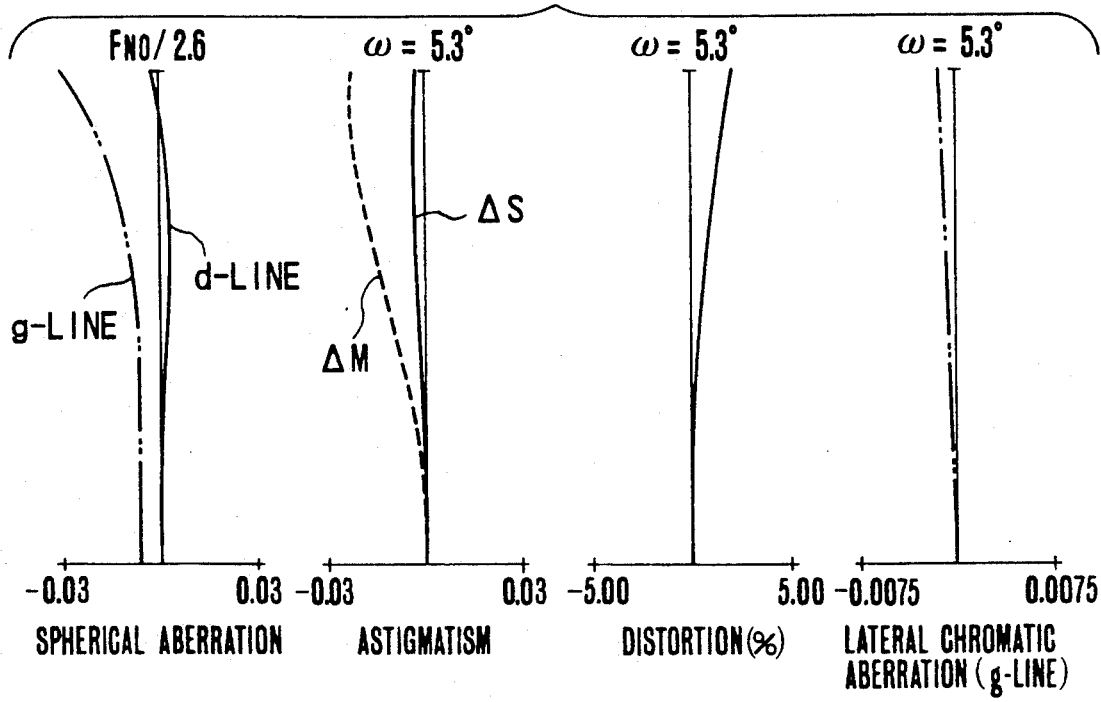

Numerical Example 6: (FIGS. 11A, 11B and 11C)
$F = 1 - 5.7 \quad FNO = 1 : 2.0 - 2.6 \quad 2\omega = 55.4° - 10.6°$

| R1 = 9.4878 | D1 = 0.1476 | N1 = 1.80518 | υ1 = 25.4 |
|---|---|---|---|
| R2 = 2.8084 | D2 = 0.6066 | N2 = 1.60311 | υ2 = 60.7 |
| R3 = −12.8907 | D3 = 0.0328 | | |
| R4 = 2.3121 | D4 = 0.3607 | N3 = 1.80400 | υ3 = 46.6 |
| R5 = 6.6490 | D5 = Variable | | |
| R6 = 8.1795 | D6 = 0.0820 | N4 = 1.88300 | υ4 = 40.8 |
| R7 = 0.7490 | D7 = 0.3607 | | |
| R8 = −1.1372 | D8 = 0.0820 | N5 = 1.51742 | υ5 = 52.4 |
| R9 = 1.1372 | D9 = 0.2623 | N6 = 1.80518 | υ6 = 25.4 |
| R10 = −9.0495 | D10 = Variable | | |
| R11 = Stop | D11 = 0.1600 | N7 = 1.60311 | υ7 = 60.7 |
| R12 = 2.1396 | D12 = 0.3771 | | |
| R13 = −4.1992 | D13 = Variable | N8 = 1.84666 | υ8 = 23.8 |
| R14 = 12.8171 | D14 = 0.0984 | | |
| R15 = 1.8253 | D15 = 0.0328 | N9 = 1.51633 | υ9 = 64.1 |
| R16 = 2.2060 | D16 = 0.3935 | | |
| R17 = −1.9023 | D17 = 0.0328 | N10 = 1.48749 | υ10 = 70.2 |
| R18 = 3.3465 | D18 = 0.2951 | | |
| R19 = −163.9585 | D19 = 0.8198 | N11 = 1.51633 | υ11 = 64.1 |
| R20 = ∞ | D20 = 0.9182 | | |
| R21 = ∞ | | | |

Lens Separations during Zooming

| Focal Length | 1.00 | 3.01 | 5.70 |
|---|---|---|---|
| D5 | 0.15 | 1.32 | 1.83 |
| D10 | 1.87 | 0.70 | 0.19 |
| D13 | 0.93 | 0.44 | 0.93 |

Figure 12A:
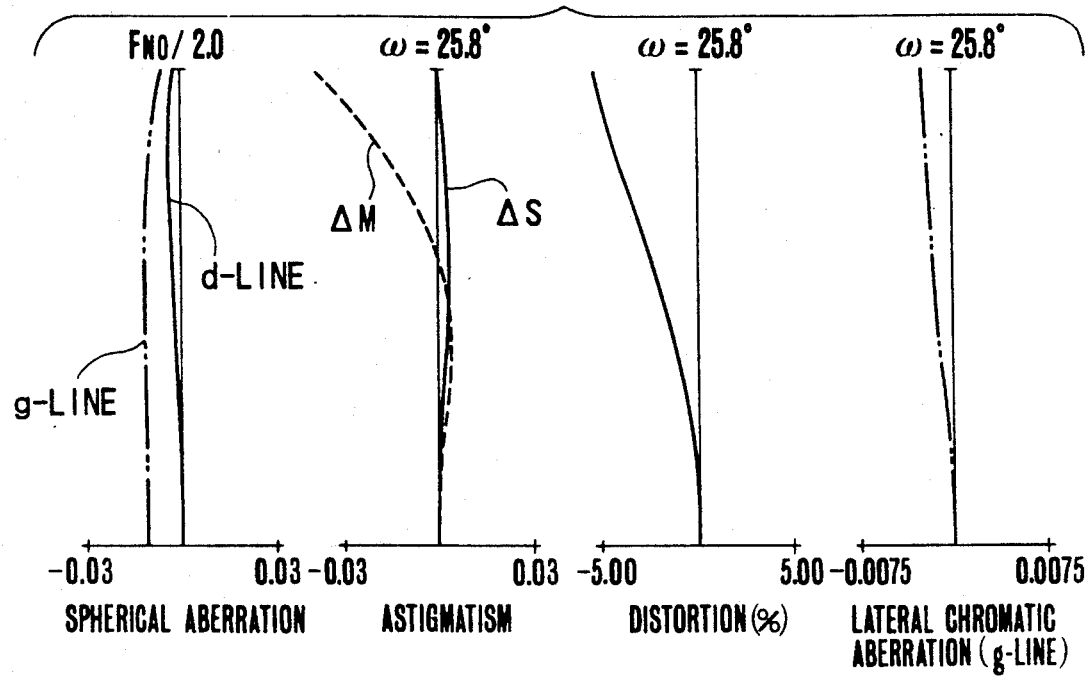
FIGS. 12A, 12B and 12C are graphic representations of the aberrations of a numerical example 7.
Figure 12B:
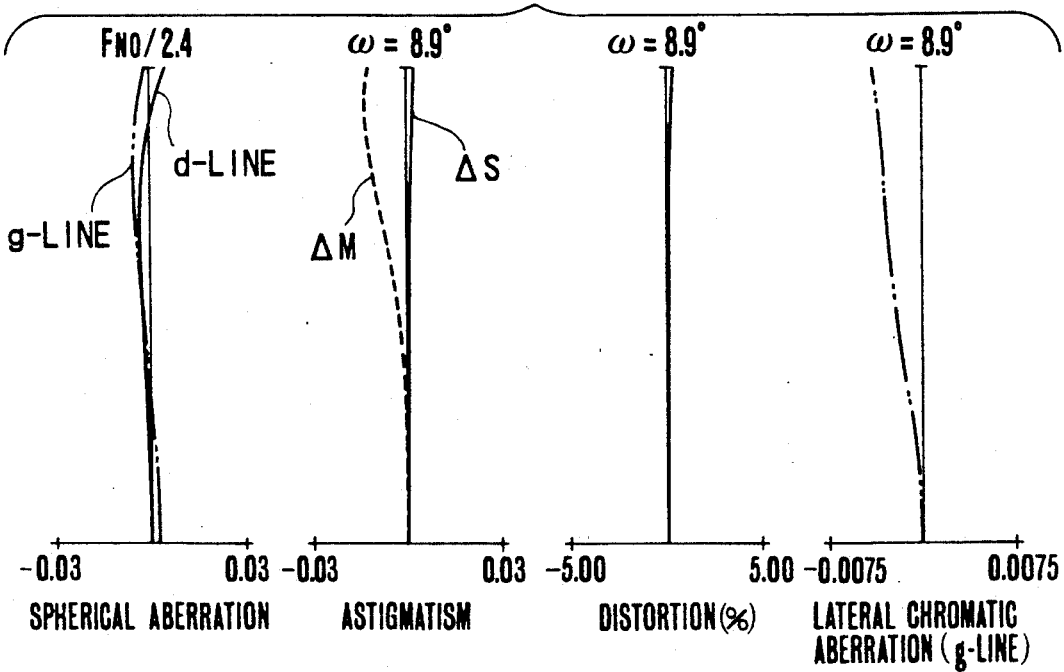
Figure 12C:
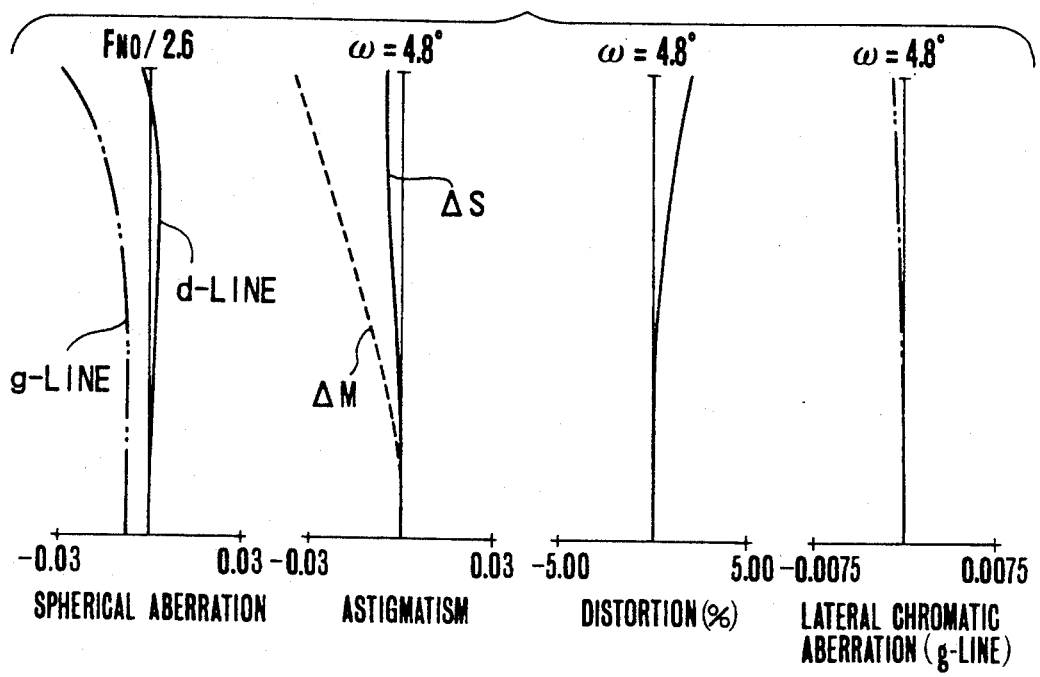

Numerical Example 7: (FIGS. 12A, 12B and 12C)
$F = 1 - 5.7 \quad FNO = 1 : 2.0 - 2.6 \quad 2\omega = 51.6° - 9.6°$

| R1 = 10.7657 | D1 = 0.1360 | N1 = 1.80518 | υ1 = 25.4 |
|---|---|---|---|
| R2 = 2.8816 | D2 = 0.5589 | N2 = 1.60311 | υ2 = 60.7 |
| R3 = −9.0104 | D3 = 0.0302 | | |
| R4 = 2.1850 | D4 = 0.3323 | N3 = 1.80400 | υ3 = 46.6 |
| R5 = 5.7055 | D5 = Variable | | |
| R6 = 34.3816 | D6 = 0.0755 | N4 = 1.88300 | υ4 = 40.8 |
| R7 = 0.7569 | D7 = 0.3323 | | |
| R8 = −1.1128 | D8 = 0.0755 | N5 = 1.51742 | υ5 = 52.4 |
| R9 = 1.1128 | D9 = 0.2417 | N6 = 1.80518 | υ6 = 25.4 |
| R10 = −10.4031 | D10 = Variable | | |
| R11 = Stop | D11 = 0.1600 | N7 = 1.60311 | υ7 = 60.7 |
| R12 = 1.9442 | D12 = 0.3474 | | |
| R13 = −4.3883 | D13 = Variable | N8 = 1.84666 | υ8 = 23.8 |
| R14 = 7.4116 | D14 = 0.0906 | | |
| R15 = 1.6786 | D15 = 0.0302 | N9 = 1.51633 | υ9 = 64.1 |
| R16 = 2.0404 | D16 = 0.3625 | | |
| R17 = −1.8139 | D17 = 0.0302 | N10 = 1.48749 | υ10 = 70.2 |
| R18 = 3.8459 | D18 = 0.2719 | | |
| R19 = −151.0575 | D19 = 0.7553 | N11 = 1.51633 | υ11 = 64.1 |
| R20 = ∞ | D20 = 0.8459 | | |
| R21 = ∞ | | | |

Lens Separations during Zooming

| Focal Length | 1.00 | 3.07 | 5.70 |
|---|---|---|---|
| D5 | 0.25 | 1.33 | 1.79 |
| D10 | 1.66 | 0.58 | 0.12 |
| D13 | 0.79 | 0.30 | 0.79 |

In a further embodiment, the third lens unit of the numerical examples 5 to 7 is otherwise constructed in the form of a single lens having an aspheric surface with an advantage of better correcting spherical aberration and coma while the total number of lens elements is reduced.

Further, it is desirable that the single lens for the third lens unit is bi-convex and satisfies the following conditions:

$$3.2 < |R_{32}/F_3| < 4.5 \quad \ldots (7)$$

$$55 < \upsilon_3 \quad \ldots (8)$$

where $R_{32}$ and $U_3$ are respectively the radius of curvature of the rear surface and the Abbe number of the glass of this single lens.

When the radius of curvature of the rear surface is small beyond the lower limit of the inequalities of condition (7), under-correction of spherical aberration results. Conversely when the upper limit is exceeded, the intensity of ghost arising between this lens surface and the image plane increases or a necessity of creating a surplus space in between the third and fourth lens units arises.

When the Abbe number is small beyond the lower limit of the inequality of condition (8), it becomes difficult to well correct longitudinal chromatic aberration.

Numerical examples 8 and 9 of the invention employing the lens form depicted in FIG. 2 are shown below.

Figure 13A:
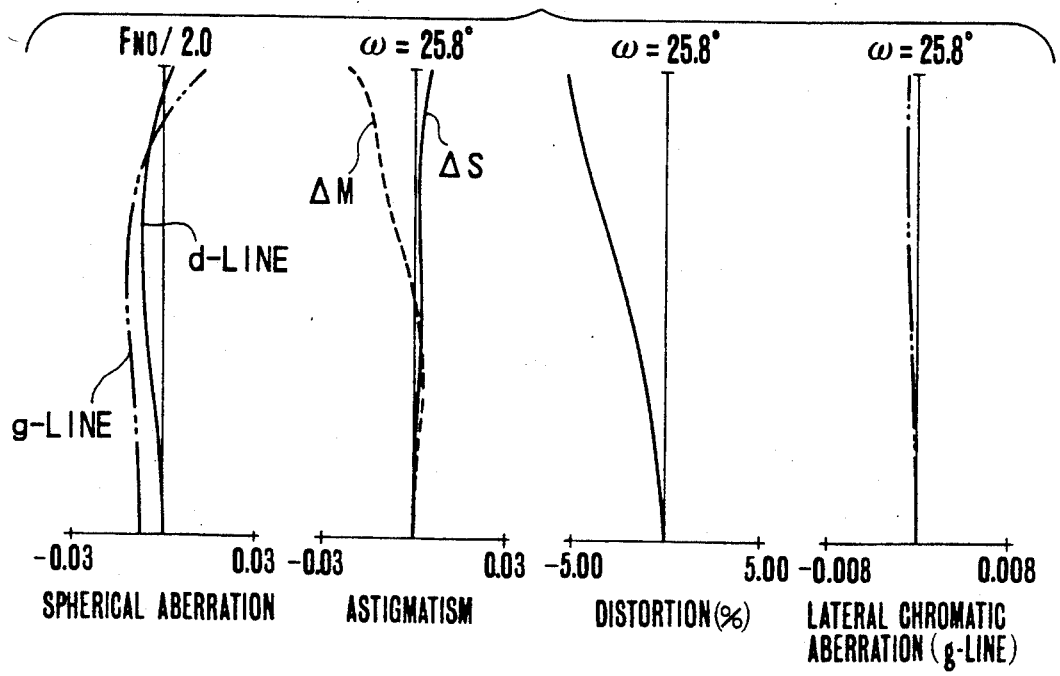
FIGS. 13A, 13B and 13C are graphic representations of the aberrations of a numerical example 8.
Figure 13B:
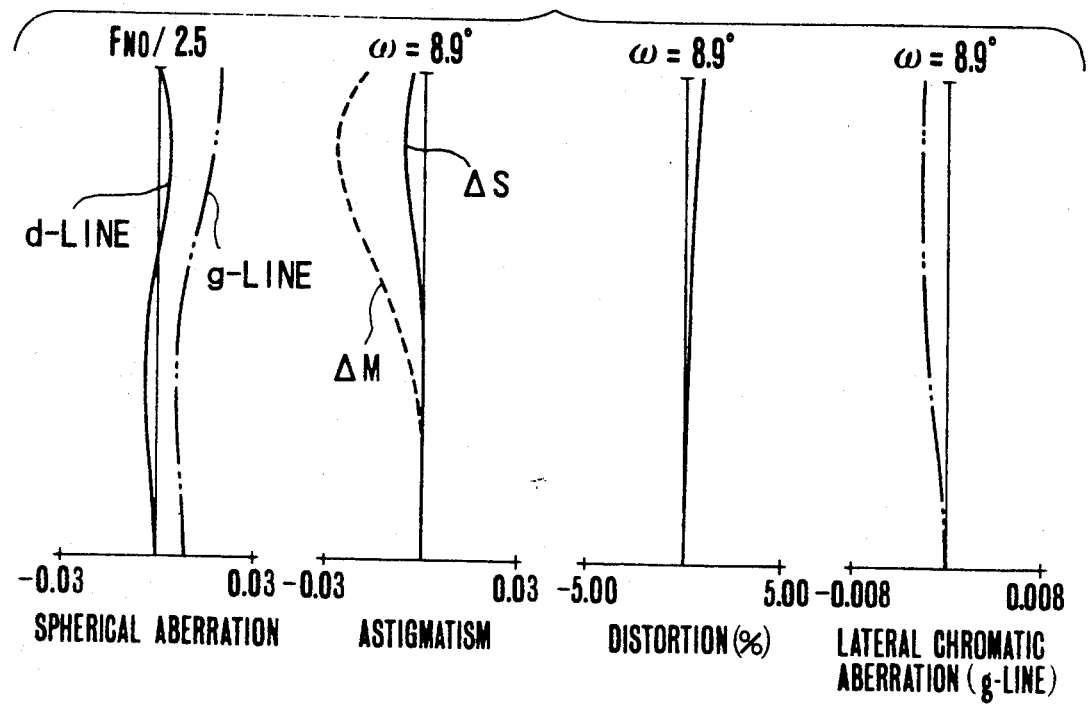
Figure 13C:
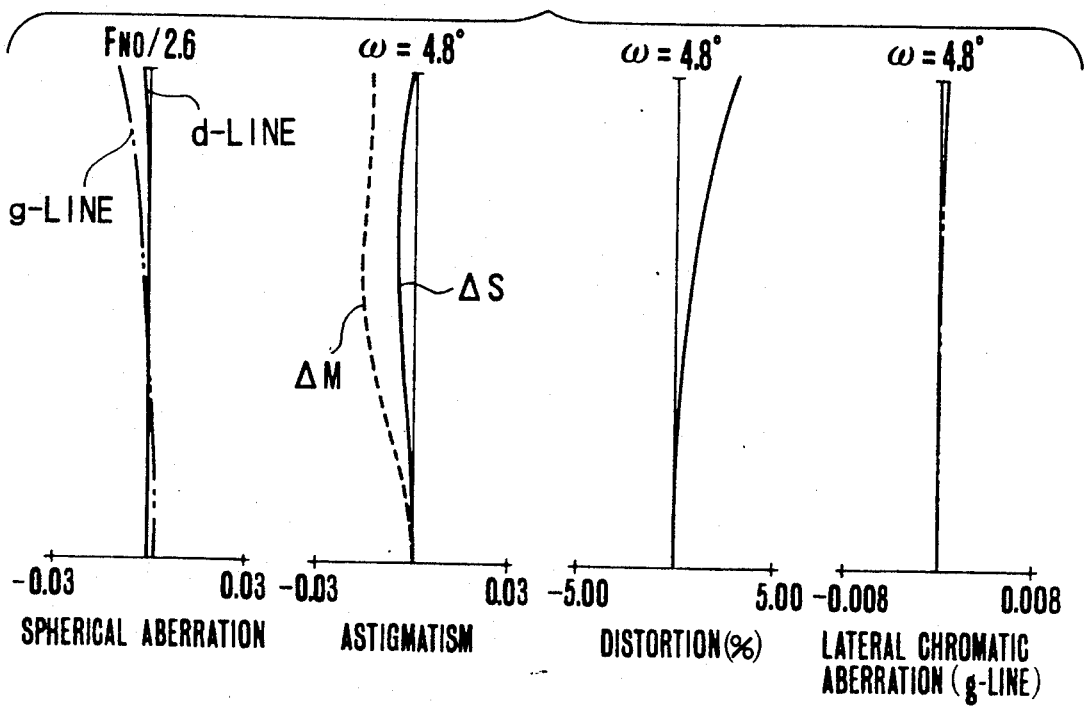

Numerical Example 8: (FIGS. 13A, 13B and 13C)
$F = 1 - 5.7$   $FNO = 1 : 2.0 - 2.6$   $2\omega\ 51.6° - 9.7°$

| | | | |
|---|---|---|---|
| R1 = 11.7467 | D1 = 0.1360 | N1 = 1.80518 | v1 = 25.4 |
| R2 = 2.9700 | D2 = 0.5136 | N2 = 1.60311 | v2 = 60.7 |
| R3 = −7.3390 | D3 = 0.0302 | | |
| R4 = 2.1859 | D4 = 0.3172 | N3 = 1.77250 | v3 = 49.6 |
| R5 = 5.6298 | D5 = Variable | | |
| R6 = −128.7751 | D6 = 0.0755 | N4 = 1.78590 | v4 = 44.2 |
| R7 = 0.7747 | D7 = 0.3215 | | |
| R8 = −1.1398 | D8 = 0.0755 | N5 = 1.51742 | v5 = 52.4 |
| R9 = 1.1398 | D9 = 0.2417 | N6 = 1.84666 | v6 = 23.8 |
| R10 = 23.6055 | D10 = Variable | | |
| R11 = Stop | D11 = 0.1800 | N7 = 1.58313 | v7 = 59.4 |
| R12 = Aspherical | D12 = 0.4230 | | |
| R13 = −8.0568 | D13 = Variable | N8 = 1.84666 | v8 = 23.8 |
| R14 = 2.2319 | D14 = 0.0755 | | |
| R15 = 0.9784 | D15 = 0.0346 | N9 = 1.58313 | v9 = 59.4 |
| R16 = 1.1519 | D16 = 0.5136 | | |
| R17 = Aspherical | D17 = 0.7553 | N10 = 1.51633 | v10 = 64.1 |
| R18 = ∞ | D18 = 0.8459 | | |
| R19 = ∞ | | | |

R12: Aspherical
$R_0 = 1.5626$   $B = -6.4745 \times 10^{-2}$
$C = 3.5672 \times 10^{-3}$   $D = -3.1136 \times 10^{-2}$ R17: Aspherical
$R_0 = -2.1947$   $B = -2.8575 \times 10^{-2}$
$C = 4.9353 \times 10^{-2}$   $D = -3.4225 \times 10^{-1}$ Lens Separations during Zooming

| Focal Length | 1.00 | 3.07 | 5.70 |
|---|---|---|---|
| D5 | 0.23 | 1.31 | 1.77 |
| D10 | 1.73 | 0.65 | 0.18 |
| D13 | 0.80 | 0.30 | 0.80 |

Figure 14A:
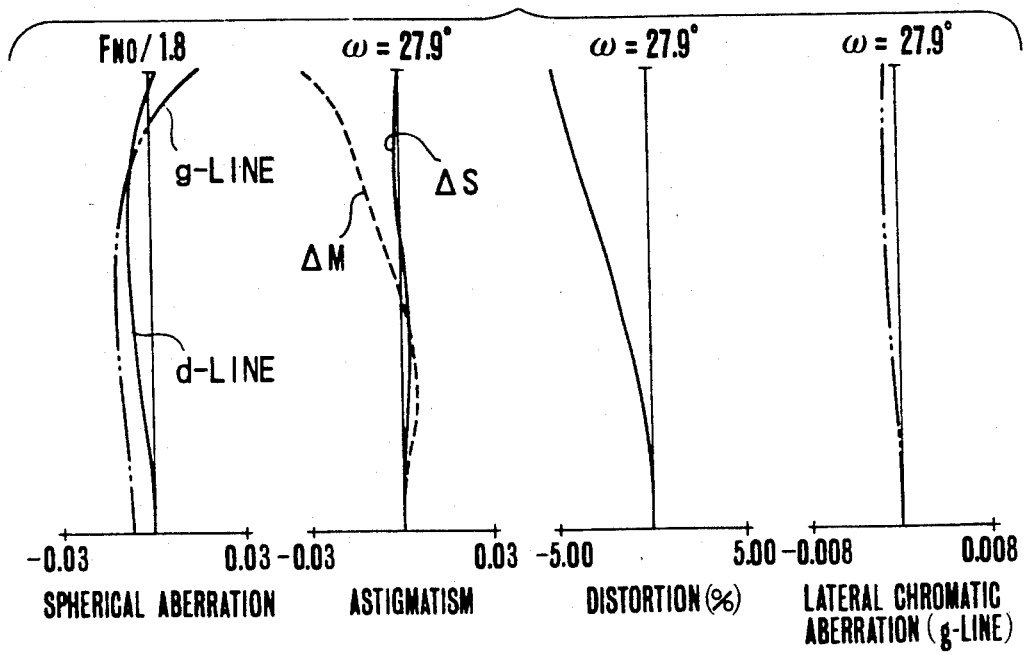
Figure 14B:
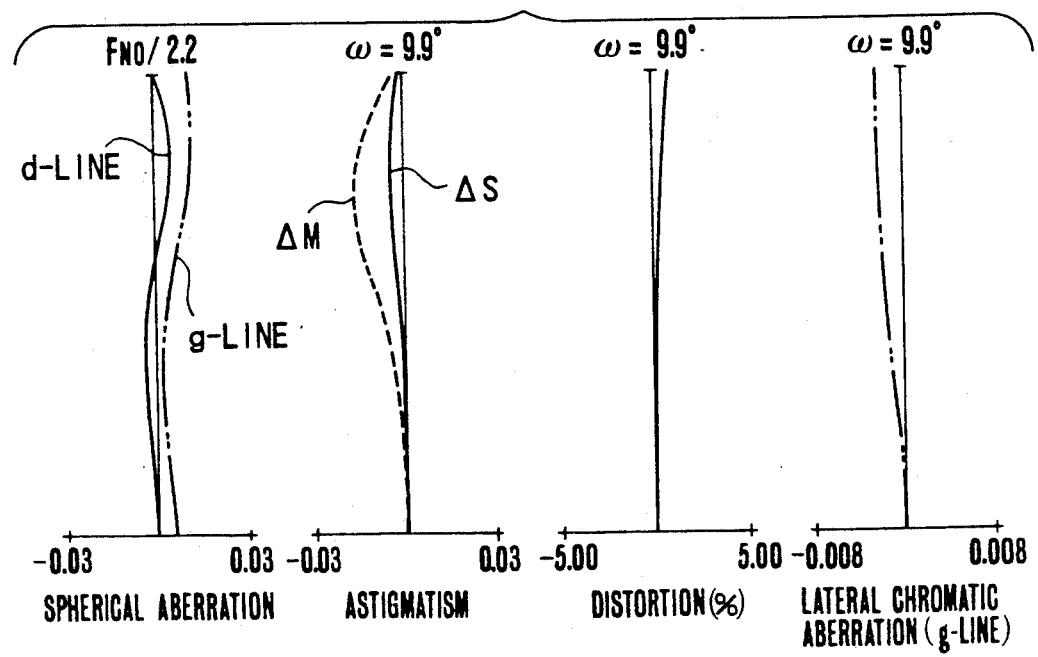

Numerical Example 9: (FIGS. 14A, 14B and 14C)
$F = 1 - 5.7$   $FNO = 1 : 1.8 - 2.6$   $2\omega = 55.8° - 10.6°$

| | | | |
|---|---|---|---|
| R1 = 9.8982 | D1 = 0.1405 | N1 = 1.80518 | v1 = 25.4 |
| R2 = 2.8504 | D2 = 0.5785 | N2 = 1.60311 | v2 = 60.7 |
| R3 = −11.1889 | D3 = 0.0331 | | |
| R4 = 2.3667 | D4 = 0.3554 | N3 = 1.80400 | v3 = 46.6 |
| R5 = 7.1765 | D5 = Variable | | |
| R6 = 11.9180 | D6 = 0.0826 | N4 = 1.88300 | v4 = 40.8 |
| R7 = 0.8058 | D7 = 0.3705 | | |
| R8 = −1.2237 | D8 = 0.0826 | N5 = 1.51742 | v5 = 52.4 |
| R9 = 1.2237 | D9 = 0.2810 | N6 = 1.84666 | v6 = 23.8 |
| R10 = −173.1570 | D10 = Variable | | |
| R11 = Stop | D11 = 0.2000 | N7 = 1.58313 | v7 = 59.4 |
| R12 = Aspherical | D12 = 0.4793 | | |

-continued

Numerical Example 9: (FIGS. 14A, 14B and 14C)
$F = 1 - 5.7$   $FNO = 1 : 1.8 - 2.6$   $2\omega = 55.8° - 10.6°$

| | | | |
|---|---|---|---|
| R13 = −9.0234 | D13 = Variable | N8 = 1.84666 | v8 = 23.8 |
| R14 = 2.5048 | D14 = 0.0826 | | |
| R15 = 1.0645 | D15 = 0.0462 | N9 = 1.58313 | v9 = 59.4 |
| R16 = 1.2669 | D16 = 0.6198 | | |
| R17 = Aspherical | D17 = 0.8264 | N10 = 1.51633 | v10 = 64.1 |
| R18 = ∞ | D18 = 1.0744 | | |
| R19 = ∞ | | | |

R12: Aspherical
$R_0 = 1.6567$   $B = -5.2154 \times 10^{-2}$
$C = 1.7118 \times 10^{-3}$   $D = -1.4258 \times 10^{-2}$ R17: Aspherical
$R_0 = -2.1958$   $B = -1.5148 \times 10^{-2}$
$C = 3.4412 \times 10^{-2}$   $D = -1.8104 \times 10^{-1}$ Lens Separations during Zooming

| Focal Length | 1.00 | 3.01 | 5.70 |
|---|---|---|---|
| D5 | 0.15 | 1.30 | 1.79 |
| D10 | 1.87 | 0.72 | 0.23 |
| D13 | 0.83 | 0.35 | 0.83 |

TABLE 1

| Condition | | Numerical Example | | | |
|---|---|---|---|---|---|
| No. | Factor | 1 | 2 | 3 | 4 |
| (1) | $\frac{F_1^2 \cdot F_{NOT} \cdot \tan\omega T}{F_T^2}$ | 0.086 | 0.086 | 0.094 | 0.0568 |
| (2) | $|F_2/F_T|$ | 0.147 | 0.150 | 0.162 | 0.1198 |
| (3) | $|F_3/F_4|$ | 0.705 | 0.675 | 0.655 | 0.7558 |

TABLE 2

| Condition | | Numerical Example | | |
|---|---|---|---|---|
| No. | Factor | 5 | 6 | 7 |
| (4) | $|(S_K - E)/F_W|$ | 1.191 | 1.130 | 1.370 |
| (5) | $|F_3/F_4|$ | 0.699 | 0.675 | 0.677 |
| (6) | $|F_2/F_W|$ | 0.835 | 0.853 | 0.785 |

TABLE 3

| Condition | | Numerical Example | |
|---|---|---|---|
| No. | Factor | 8 | 9 |
| (6) | $|F_2/F_2|$ | 0.785 | 0.835 |
| (4) | $|S_K - E)/F_W|$ | 1.370 | 1.223 |
| (5) | $|F_3/F_4|$ | 0.678 | 0.690 |
| (7) | $|R_{32}/F_3|$ | 3.532 | 3.697 |
| (8) | $U_3$ | 59.4 | 59.4 |

What is claimed is:

1. A zoom lens comprising, from an object side, a first lens unit of positive refractive power, a second lens unit of negative refractive power, a third lens unit of positive refractive power and a fourth lens unit of positive refractive power, wherein zooming from a wide-angle end to a telephoto end is performed by axially moving said second lens unit toward an image side, and focusing and compensating for the shift of an image resulting from the zooming are performed by axially moving said fourth lens unit, whereby letting the focal length of the i-th lens unit be denoted by Fi, the following condition is satisfied:

$$0.59 < |F_3/F_4| < 0.85$$

2. A zoom lens according to claim 1, satisfying the following condition:

$$0.02 < \frac{F_1^2 \cdot F_{NOT} \cdot \tan \omega T}{F_T^2} < 0.1$$

where $F_T$, $F_{NOT}$ and $\omega T$ are respectively the focal length of the entire lens system in the telephoto end, the F-number at full open aperture in the telephoto end and the semiangle of view in the telephoto end.

3. A zoom lens according to claim 1 or 2, satisfying the following condition:

$$0.09 < |F_2/F_T| < 0.2$$

where $F_T$ is the focal length of the entire lens system in the telephoto end.

4. A zoom lens according to claim 1, further comprising a stop on the object side of said third lens unit and satisfying the following condition:

$$1.05 < |(S_K - E)/F_W| < 1.45$$

where $E = E_1/(1 - E_1/F_3) + E_2$
wherein $F_W$ is the focal length of the entire lens system in the wide-angle end, and $E_1$, $E_2$ and $S_K$ represent respectively the interval between said stop and a front principal point of said third lens unit, the interval between a rear principal point of said third lens unit and a front principal point of said fourth lens unit, and the interval between a rear principal point of said fourth lens unit of said fourth lens unit and the image plane when an object distance is at infinity and said fourth lens unit takes its position nearest to the object side.

5. A zoom lens according to claim 4, wherein said third lens unit has at least one aspheric surface.

6. A zoom lens according to claim 4, satisfying the following condition:

$$0.72 < |F_2/F_W| < 0.92$$

7. A zoom lens according to claim 4, wherein said third lens unit is a single lens of bi-convex form and satisfies the following conditions:

$$3.2 < |R_{32}/F_3| < 4.5$$

$$55 < U_3$$

where $R_{32}$ and $U_3$ are respectively the radius of curvature of the rear lens surface and the Abbe number of the material of said bi-convex single lens.

8. A zoom lens comprising, from an object side, a first lens unit of positive refractive power, a second lens unit of negative refractive power, a third lens unit of positive refractive power and a fourth lens unit of positive refractive power, wherein zooming from a wide-angle end to a telephoto end is performed by axially moving said second lens unit toward an image side, and focusing and compensating for the shift of an image resulting from the zooming are performed by axially moving said fourth lens unit, said zoom lens further comprising a stop on the object side of said third lens unit and satisfying the following condition:

$$1.05 < |(S_K - E)/F_W| < 1.45$$

where $E = E_1/(1 - E_1/F_3) + E_2$
wherein $F_W$ is the focal length of the entire lens system in the wide-angle end, $F_3$ is the focal length of said third lens unit, and $E_1$, $E_2$ and $S_K$ represent respectively the interval between said stop and a front principal point of said third lens unit, the interval between a rear principal point of said third lens unit and a front principal point of said fourth lens unit and the interval between a rear principal point of said fourth lens unit and the image plane when an object distance is at infinity and said fourth lens unit takes its position nearest to the object side.

* * * * *

UNITED STATES PATENT AND TRADEMARK OFFICE
CERTIFICATE OF CORRECTION

PATENT NO. : 5,138,492
DATED : August 11, 1992
INVENTOR(S) : HIROYUKI HAMANO, ET AL.

It is certified that error appears in the above-identified patent and that said Letters Patent is hereby corrected as shown below:

<u>IN THE ABSTRACT [57]</u>:

Line 12, "local" should read --focal--.

<u>Column 6</u>:

Line 7, "off axial" should read --off-axial--.

<u>Column 8</u>:

Line 62, "stop 4" should read --stop 4 is--.

<u>Column 10</u>:

Line 50, "problems also arise" should read --Problem arising is--.

Line 53, "Conversely" should read --Conversely,--.

<u>Column 11</u>:

Line 17, "ration" should read --ratio--.

UNITED STATES PATENT AND TRADEMARK OFFICE
CERTIFICATE OF CORRECTION

PATENT NO. : 5,138,492

DATED : August 11, 1992

INVENTOR(S) : HIROYUKI HAMANO, ET AL.

It is certified that error appears in the above-identified patent and that said Letters Patent is hereby corrected as shown below:

Column 14:

Table 3, "$|F_2/F_2|$" should read --$|F_2/F_w|$--.

Column 15:

Lines 32-33, the second occurrence of "of said fourth lens unit" should be deleted.

Signed and Sealed this

Fifth Day of October, 1993

Attest:

BRUCE LEHMAN

Attesting Officer      Commissioner of Patents and Trademarks